(12) United States Patent
Wilcox et al.

(10) Patent No.: US 9,519,095 B2
(45) Date of Patent: Dec. 13, 2016

(54) OPTICAL WAVEGUIDES

(71) Applicant: Cree, Inc., Durham, NC (US)

(72) Inventors: Kurt S. Wilcox, Libertyville, IL (US);
John W. Durkee, Raleigh, NC (US);
Craig D. Raleigh, Burlington, WI (US); Joseph P. Chobot, Morrisville, NC (US)

(73) Assignee: Cree, Inc., Durham, NC (US)

( * ) Notice: Subject to any disclaimer, the term of this patent is extended or adjusted under 35 U.S.C. 154(b) by 338 days.

(21) Appl. No.: 13/842,521

(22) Filed: Mar. 15, 2013

(65) Prior Publication Data

US 2014/0212090 A1     Jul. 31, 2014

Related U.S. Application Data

(60) Provisional application No. 61/758,660, filed on Jan. 30, 2013.

(51) Int. Cl.
| | |
|---|---|
| *G02B 6/00* | (2006.01) |
| *F21V 8/00* | (2006.01) |
| *F21K 99/00* | (2016.01) |
| *F21Y 101/02* | (2006.01) |

(52) U.S. Cl.
CPC ........... *G02B 6/0046* (2013.01); *F21K 9/13* (2013.01); *F21K 9/52* (2013.01); *G02B 6/0028* (2013.01); *G02B 6/0031* (2013.01); *G02B 6/0035* (2013.01); *G02B 6/0036* (2013.01); *G02B 6/0038* (2013.01); *G02B 6/0041* (2013.01); *G02B 6/0043* (2013.01); *G02B 6/0058* (2013.01); *G02B 6/0061* (2013.01); *F21Y 2101/02* (2013.01)

(58) Field of Classification Search
None
See application file for complete search history.

(56) References Cited

U.S. PATENT DOCUMENTS

| | | |
|---|---|---|
| 3,372,740 A | 3/1968 | Kastovich et al. |
| 3,532,871 A | 10/1970 | Shipman |
| 4,146,297 A | 3/1979 | Alferness et al. |
| 4,441,787 A | 4/1984 | Lichtenberger |
| 4,714,983 A | 12/1987 | Lang |

(Continued)

FOREIGN PATENT DOCUMENTS

| | | |
|---|---|---|
| DE | 20014114 | 12/2000 |
| DE | 20107425 | 7/2001 |

(Continued)

OTHER PUBLICATIONS

Web page at http://www.fusionoptix.com/lighting/components/array-optics.htm, printed May 9, 2013 (2 pages).

(Continued)

*Primary Examiner* — Michelle R Connelly
(74) *Attorney, Agent, or Firm* — McCracken & Gillen LLC

(57) ABSTRACT

An optical waveguide includes a coupling optic and a waveguide body. According to one embodiment, the body includes a first curved surface that extends between an input surface and an end surface and a second surface opposite the first surface. The input surface has a first thickness disposed between the first and second surfaces and the end surface has a second thickness disposed between the first and second surfaces less than the first thickness.

39 Claims, 31 Drawing Sheets

(56) References Cited

U.S. PATENT DOCUMENTS

| | | |
|---|---|---|
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,165,772 A * | 11/1992 | Wu ................. B60Q 1/302 362/309 |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,980,054 A * | 11/1999 | Fukui ................. G02B 6/0036 362/19 |
| 5,997,148 A | 12/1999 | Ohkawa |
| 5,999,281 A | 12/1999 | Abbott et al. |
| 5,999,685 A | 12/1999 | Goto et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| D446,333 S | 8/2001 | Fröis |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 * | 4/2002 | Nakabayashi ....... G02B 6/0018 349/63 |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang |
| 6,485,157 B2 | 11/2002 | Ohkawa |
| 6,508,563 B2 | 1/2003 | Parker et al. |
| 6,523,986 B1 | 2/2003 | Hoffmann |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 * | 10/2004 | Kuo ..................... G02B 6/0021 362/224 |
| 6,840,656 B2 | 1/2005 | Kuo |
| 6,845,212 B2 | 1/2005 | Gardiner et al. |
| 6,876,408 B2 | 4/2005 | Yamaguchi |

(56) References Cited

U.S. PATENT DOCUMENTS

| | | | |
|---|---|---|---|
| 6,894,740 B2 | 5/2005 | Ohkawa |
| 6,896,381 B2 | 5/2005 | Benitez et al. |
| 6,924,943 B2 | 8/2005 | Minano et al. |
| D511,221 S | 11/2005 | Zucker |
| 6,974,241 B2 | 12/2005 | Hara et al. |
| 6,992,335 B2 | 1/2006 | Ohkawa |
| D518,911 S | 4/2006 | Lee |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,118,253 B1 | 10/2006 | Simon |
| D532,532 S | 11/2006 | Maxik |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,182,480 B2 | 2/2007 | Kan |
| 7,192,174 B2 | 3/2007 | Myoung |
| 7,204,634 B2 | 4/2007 | Chen et al. |
| 7,209,628 B2 | 4/2007 | Winston et al. |
| 7,222,995 B1 | 5/2007 | Bayat et al. |
| 7,223,004 B2 | 5/2007 | Chen et al. |
| D544,110 S | 6/2007 | Hooker et al. |
| 7,246,931 B2 | 7/2007 | Hsieh et al. |
| 7,265,800 B2 | 9/2007 | Jagt et al. |
| 7,273,299 B2 | 9/2007 | Parkyn et al. |
| 7,290,906 B2 * | 11/2007 | Suzuki et al. ............... 362/511 |
| 7,292,767 B2 | 11/2007 | Cheng |
| D563,036 S | 2/2008 | Miyairi et al. |
| D565,778 S | 4/2008 | Pedersen |
| D566,300 S | 4/2008 | Lo |
| 7,364,342 B2 | 4/2008 | Parker et al. |
| D568,529 S | 5/2008 | Colleran, Jr. et al. |
| D570,025 S | 5/2008 | Walker |
| D573,292 S | 7/2008 | Zheng et al. |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| D575,898 S | 8/2008 | Tran et al. |
| 7,407,303 B2 | 8/2008 | Wanninger et al. |
| 7,422,357 B1 | 9/2008 | Chang |
| D581,555 S | 11/2008 | To et al. |
| 7,458,714 B2 | 12/2008 | Chang |
| 7,465,074 B2 | 12/2008 | Blumel |
| D584,838 S | 1/2009 | To et al. |
| 7,486,854 B2 | 2/2009 | Van Ostrand et al. |
| 7,488,093 B1 | 2/2009 | Huang et al. |
| D587,839 S | 3/2009 | Guercio |
| D589,195 S | 3/2009 | Sabernig |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| D604,002 S | 11/2009 | Santoro |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| D609,384 S | 2/2010 | Gray et al. |
| D610,722 S | 2/2010 | Bi |
| D612,527 S | 3/2010 | Espiau et al. |
| 7,674,018 B2 | 3/2010 | Holder et al. |
| 7,703,950 B2 | 4/2010 | Ewert et al. |
| 7,703,967 B2 | 4/2010 | Parker |
| D615,232 S | 5/2010 | Xiao et al. |
| D616,145 S | 5/2010 | Boissevain |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| D617,489 S | 6/2010 | Santoro |
| D618,842 S | 6/2010 | Ngai et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| D622,894 S | 8/2010 | Ngai et al. |
| 7,766,515 B2 | 8/2010 | Condon et al. |
| 7,775,697 B2 * | 8/2010 | Hirano ............... F21S 48/2243 362/509 |
| 7,776,236 B2 | 8/2010 | Shih et al. |
| 7,780,306 B2 | 8/2010 | Hoshi |
| 7,784,954 B1 | 8/2010 | Coleman |
| D623,793 S | 9/2010 | Ngai et al. |
| 7,798,695 B2 | 9/2010 | Parker |
| D626,260 S | 10/2010 | Wei |
| 7,806,581 B2 | 10/2010 | Lee |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| D627,913 S | 11/2010 | Gielen |
| D628,319 S | 11/2010 | Yoshinobu et al. |
| 7,826,698 B1 | 11/2010 | Meir et al. |
| D629,129 S | 12/2010 | Lin et al. |
| 7,850,357 B2 | 12/2010 | Kim et al. |
| 7,857,619 B2 | 12/2010 | Liu |
| D630,347 S | 1/2011 | Pei et al. |
| D630,775 S | 1/2011 | Pan |
| D631,577 S | 1/2011 | Yoshinobu et al. |
| D631,601 S | 1/2011 | Lodhie |
| 7,866,871 B2 | 1/2011 | Couzin et al. |
| D633,636 S | 3/2011 | Gielen |
| D634,056 S | 3/2011 | Hokzaono et al. |
| 7,905,646 B2 | 3/2011 | Adachi et al. |
| 7,907,804 B2 | 3/2011 | Meir et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| D641,923 S | 7/2011 | Radchenko et al. |
| 7,976,204 B2 | 7/2011 | Li et al. |
| D642,725 S | 8/2011 | Kong et al. |
| 7,991,257 B1 | 8/2011 | Coleman |
| 7,997,784 B2 | 8/2011 | Tsai |
| 8,002,450 B2 | 8/2011 | Van Ostrand et al. |
| D645,194 S | 9/2011 | Budike, Jr. et al. |
| D646,406 S | 10/2011 | Tsai et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,696 B2 | 11/2011 | Ijzerman et al. |
| 8,052,316 B2 | 11/2011 | Lee |
| 8,054,409 B2 | 11/2011 | Hsieh et al. |
| 8,061,877 B2 | 11/2011 | Chang |
| 8,064,743 B2 | 11/2011 | Meir et al. |
| 8,067,884 B2 | 11/2011 | Li |
| 8,075,157 B2 | 12/2011 | Zhang et al. |
| 8,087,807 B2 | 1/2012 | Liu et al. |
| 8,092,068 B2 | 1/2012 | Parker et al. |

(56) References Cited

U.S. PATENT DOCUMENTS

| | | |
|---|---|---|
| 8,096,671 B1 | 1/2012 | Cronk et al. |
| 8,096,681 B2 | 1/2012 | Fang et al. |
| D654,618 S | 2/2012 | Kong et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| D659,880 S | 5/2012 | Maxik et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| D662,255 S | 6/2012 | Kluś |
| D662,256 S | 6/2012 | Kluś |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| D668,370 S | 10/2012 | Guercio |
| 8,277,106 B2 | 10/2012 | Van Gorkom et al. |
| 8,282,261 B2 | 10/2012 | Pance et al. |
| 8,283,853 B2 | 10/2012 | Yan et al. |
| 8,287,152 B2 | 10/2012 | Gill |
| 8,297,801 B2 | 10/2012 | Coushaine et al. |
| 8,297,818 B2 | 10/2012 | Richardson |
| D670,422 S | 11/2012 | Siekmann |
| D670,856 S | 11/2012 | Butler et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,325,292 B2 * | 12/2012 | Ouchi ............... G02B 6/0038 349/62 |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,353,606 B2 | 1/2013 | Jeong |
| 8,369,678 B2 | 2/2013 | Chakmakjian et al. |
| 8,382,354 B2 | 2/2013 | Kim et al. |
| 8,382,387 B1 | 2/2013 | Sandoval |
| D677,806 S | 3/2013 | Jiang et al. |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,437 S | 4/2013 | Watt |
| D679,444 S | 4/2013 | Vasylyev |
| D679,843 S | 4/2013 | Hsu et al. |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| D684,296 S | 6/2013 | Henderson et al. |
| 8,454,218 B2 * | 6/2013 | Wang et al. ................. 362/607 |
| 8,461,602 B2 | 6/2013 | Lerman et al. |
| 8,469,559 B2 | 6/2013 | Williams |
| 8,475,010 B2 | 7/2013 | Vissenberg et al. |
| 8,485,684 B2 | 7/2013 | Lou et al. |
| 8,506,112 B1 | 8/2013 | Dau et al. |
| 8,534,896 B2 | 9/2013 | Boonekamp |
| 8,534,901 B2 | 9/2013 | Panagotacos et al. |
| 8,547,022 B2 | 10/2013 | Summerford et al. |
| 8,567,983 B2 | 10/2013 | Boyer et al. |
| 8,567,986 B2 | 10/2013 | Szprengiel et al. |
| D694,449 S | 11/2013 | Walker |
| 8,573,823 B2 | 11/2013 | Dau et al. |
| 8,585,253 B2 | 11/2013 | Duong et al. |
| 8,593,070 B2 | 11/2013 | Wang et al. |
| D695,442 S | 12/2013 | Speier et al. |
| D695,447 S | 12/2013 | Speier et al. |
| 8,598,778 B2 | 12/2013 | Allen et al. |
| 8,602,586 B1 | 12/2013 | Dau et al. |
| 8,608,351 B2 | 12/2013 | Peifer |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,724,052 B2 | 5/2014 | Hsieh et al. |
| 8,740,440 B2 * | 6/2014 | Mizuno et al. ............... 362/613 |
| 8,755,005 B2 | 6/2014 | Bierhuizen et al. |
| 8,833,999 B2 | 9/2014 | Wang et al. |
| 8,864,360 B2 | 10/2014 | Parker et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 * | 2/2003 | Needham Riddle et al. 345/589 |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0213003 A1 | 10/2004 | Lauderdale et al. |
| 2004/0240217 A1 | 12/2004 | Rice |
| 2005/0111235 A1 | 5/2005 | Suzuki et al. |
| 2005/0210643 A1 | 9/2005 | Mezei et al. |
| 2006/0002146 A1 | 1/2006 | Baba |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0037284 A1 | 2/2008 | Rudisill |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 * | 8/2008 | Turner ........................ 385/146 |
| 2009/0103293 A1 | 4/2009 | Harbers et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2010/0008088 A1 * | 1/2010 | Koizumi et al. ............... 362/235 |
| 2010/0027257 A1 | 2/2010 | Boonekamp et al. |
| 2010/0046219 A1 | 2/2010 | Pijlman et al. |
| 2010/0073597 A1 | 3/2010 | Bierhuizen et al. |

(56) References Cited

U.S. PATENT DOCUMENTS

| | | |
|---|---|---|
| 2010/0079843 A1 | 4/2010 | Derichs et al. |
| 2010/0079980 A1 | 4/2010 | Sakai |
| 2010/0128483 A1 | 5/2010 | Reo et al. |
| 2010/0133422 A1 | 6/2010 | Lin et al. |
| 2010/0157577 A1* | 6/2010 | Montgomery et al. ...... 362/97.2 |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0328936 A1 | 12/2010 | Pance et al. |
| 2011/0007505 A1 | 1/2011 | Wang |
| 2011/0037388 A1 | 2/2011 | Lou et al. |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0249467 A1 | 10/2011 | Boonekamp |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0026728 A1 | 2/2012 | Lou et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0069579 A1* | 3/2012 | Koh ................ G02B 6/0021 362/307 |
| 2012/0069595 A1* | 3/2012 | Catalano ................ 362/555 |
| 2012/0113676 A1 | 5/2012 | Van Dijk et al. |
| 2012/0114284 A1* | 5/2012 | Ender ................ 385/32 |
| 2012/0120651 A1 | 5/2012 | Peck |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0298181 A1 | 11/2012 | Cashion et al. |
| 2012/0320626 A1 | 12/2012 | Quilici et al. |
| 2013/0010464 A1 | 1/2013 | Shuja et al. |
| 2013/0028557 A1* | 1/2013 | Lee et al. ................ 385/28 |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0044480 A1 | 2/2013 | Sato et al. |
| 2013/0077298 A1 | 3/2013 | Steele et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0071687 A1 | 3/2014 | Tickner et al. |
| 2014/0168955 A1 | 6/2014 | Gershaw |
| 2014/0268879 A1 | 9/2014 | Mizuyama et al. |
| 2014/0334126 A1 | 11/2014 | Speier et al. |
| 2015/0003059 A1 | 1/2015 | Haitz et al. |

FOREIGN PATENT DOCUMENTS

| | | | |
|---|---|---|---|
| DE | 10047101 | 5/2002 | |
| DE | 10203106 | 7/2003 | |
| DE | 10302563 | 7/2004 | |
| DE | 10302564 | 7/2004 | |
| DE | 102006009325 | 9/2007 | |
| DE | 102006011296 | 9/2007 | |
| DE | 102006013343 | 9/2007 | |
| EP | 1167870 A2 * | 1/2002 | ............ F21S 48/215 |
| JP | H 10173870 | 6/1998 | |
| JP | 2000147264 | 5/2000 | |
| JP | 3093080 U | 12/2005 | |
| WO | WO 96/21122 | 7/1996 | |
| WO | WO 96/21884 | 7/1996 | |
| WO | WO 99/04531 | 1/1999 | |
| WO | WO 03/031869 | 4/2003 | |
| WO | WO 2008102655 A1 * | 8/2008 | ............ G02B 6/003 |
| WO | WO 2009/012484 | 1/2009 | |
| WO | WO 2011/130648 | 10/2011 | |
| WO | WO 2013/078463 | 5/2013 | |
| WO | WO 2013/082537 | 6/2013 | |

OTHER PUBLICATIONS

U.S. Appl. No. 13/657,421, filed Oct. 22, 2012 (38 pages).
Web page at http://www.oluce.com/en/lamps/table/colombo-281-detail, printed Nov. 19, 2013 (2 pages).
International Search Report and Written Opinion dated Jul. 10, 2014, for International Application No. PCT/US2014/013400, Applicant, Cree, Inc. (21 pages).
Invitation to Pay Additional Fees dated Apr. 30, 2014, for International Application No. PCT/US2014/013400, Applicant, Cree, Inc. (2 pages).
International Search Report and Written Opinion dated Jul. 10, 2014, for International Application No. PCT/US2014/013934, Applicant, Cree, Inc. (19 pages).
Invitation to Pay Additional Fees dated May 1, 2014, for International Application No. PCT/US2014/013934, Applicant, Cree, Inc. (2 pages).
International Search Report and Written Opinion dated Jul. 24, 2014, for International Application No. PCT/US2014/28887, Applicant, Cree, Inc. (15 pages).
International Search Report and Written Opinion dated Jul. 28, 2014, for International Application No. PCT/US2014/28938, Applicant, Cree, Inc. (19 pages).
International Search Report and Written Opinion dated Jul. 14, 2014, for International Application No. PCT/US2014/013931 Applicant, Cree, Inc. (21 pages).

(56) References Cited

OTHER PUBLICATIONS

International Search Report and Written Opinion for International Application No. PCT/US2014/013854, issued Jun. 5, 2014, Applicant, Cree, Inc. (15 pages).
Drain, Kieran, "Transformations in Lighting: 2011 DOE Solid-State Lighting R&D Workshop, Panel 3: Novel Lighting Concepts for Large Interior Spaces," PowerPoint presentation, Nov. 2013 (23 pages).
Ji et al., "Electrically Controllable Microlens Array Fabricated by Anisotropic Phase Separation From Liquid-Crystal and Polymer Composite Materials," vol. 28, No. 13, *Optics Letters*, pp. 1147-1149, Jul. 1, 2003 (4 pages).
Iijima., et al., "Document Scanner Using Polymer Waveguides With a Microlens Array," *Optical Engineering*, vol. 41, Issue 11, pp. 2743-2748, Oct. 28, 2002 (4 pages).
Invitation to Pay Additional Fees dated May 1, 2014, for International Application No. PCT/US2014/013931, Applicant: Cree, Inc. (2 pages).
International Search Report and Written Opinion for International Application No. PCT/US2014/013408, issued Jul. 17, 2014, Applicant, Cree, Inc. (21 pages).
Invitation to Pay Additional Fees for International Application No. PCT/US2014/013408, issued May 8, 2014, Applicant, Cree, Inc. (2 pages).

\* cited by examiner

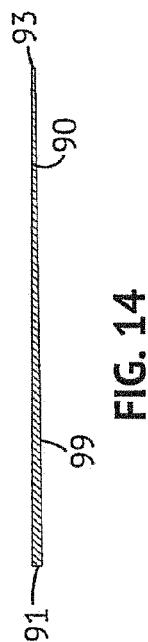
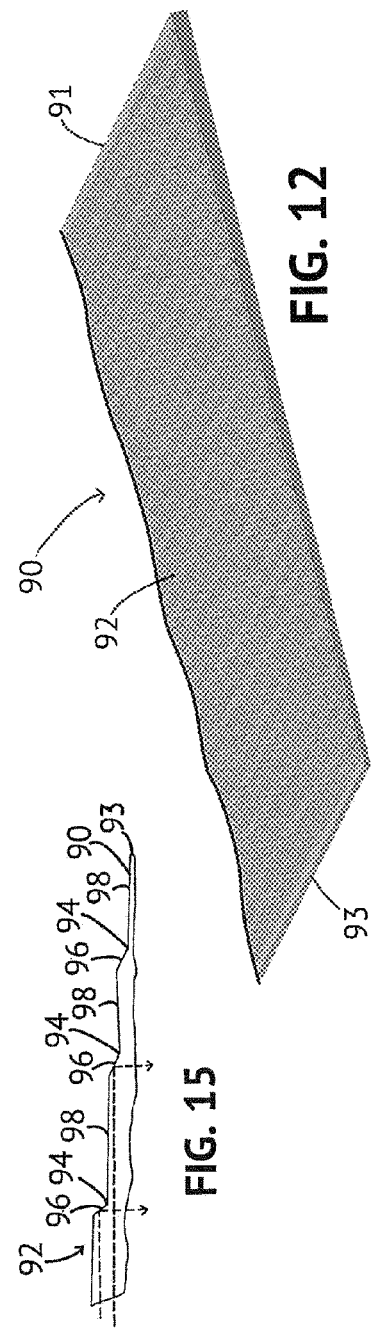
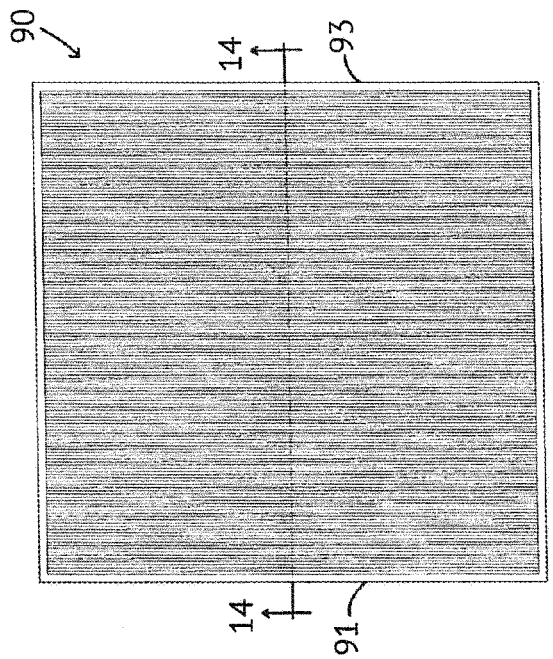

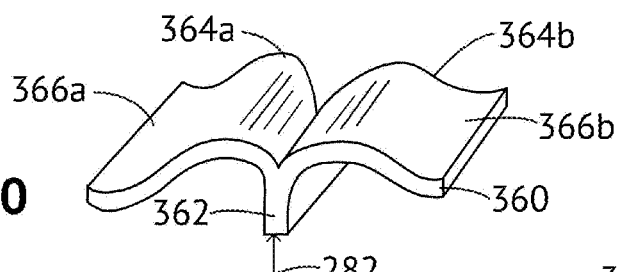
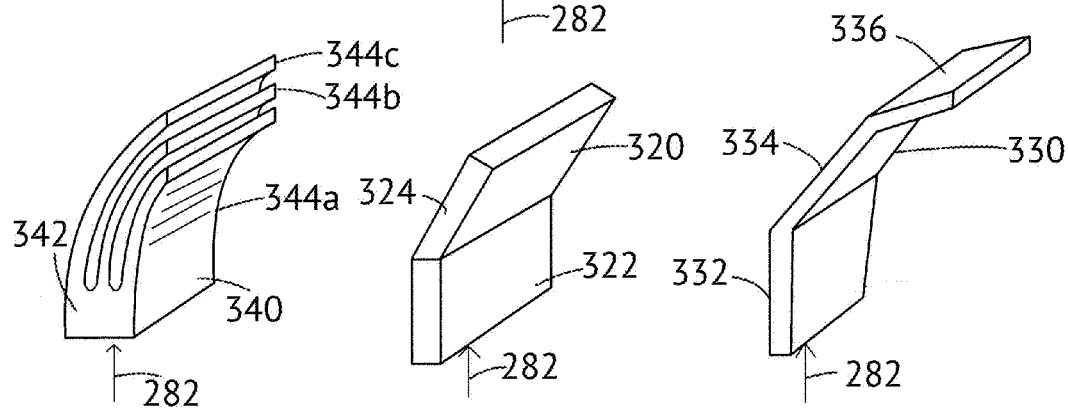
FIG. 40
FIG. 38  FIG. 36  FIG. 37
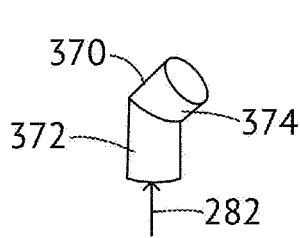
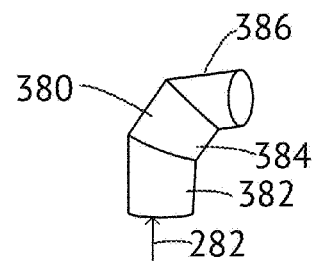
FIG. 41  FIG. 42

OPTICAL WAVEGUIDES

CROSS REFERENCE TO RELATED APPLICATIONS

The present application claims the benefit of U.S. Provisional patent application Ser. No. 61/758,660, filed Jan. 30, 2013, entitled "Optical Waveguide" and owned by the assignee of the present application, and the disclosure of which is incorporated by reference herein.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present inventive subject matter relates to optical waveguides, and more particularly to optical waveguides for general lighting.

2. Background of the Invention

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or a coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

SUMMARY OF THE INVENTION

According to one aspect of the present invention, an optical waveguide body includes a first curved surface that extends between an input surface and an end surface and a second surface opposite the first surface. The input surface has a first thickness disposed between the first and second surfaces and the end surface has a second thickness disposed between the first and second surfaces less than the first thickness.

In accordance with another aspect of the present invention, a waveguide body includes a body of optically transmissive material having an input surface for light to enter the body of optically transmissive material along a light path.

The body of optically transmissive material is curved and has an inflection region that extends transverse to the light path.

In accordance with yet another aspect of the present invention, a waveguide body comprises a body of optically transmissive material having an input surface for light to enter the body of optically transmissive material along a light path wherein the body of optically transmissive material is curved and has a plurality of inflection regions.

In accordance with a still thither aspect of the present invention, a waveguide includes a body of optically transmissive material. A plurality of LEDs is spaced about the body of optically transmissive material such that light developed by the plurality of LEDs is directed through an input edge surface of the body of optically transmissive surface. Extraction features carried by the body of optically transmissive material are provided for directing light developed by the plurality of LEDs out of the body of optically transmissive material.

In accordance with yet another aspect of the present invention, a coupling optic comprises a coupling optic body including a plurality of input cavities each defined by a wall wherein a projection is disposed in each cavity. Further, a recess is disposed in each projection and the recess of each projection is adapted to receive an associated LED.

Other aspects and advantages of the present invention will become apparent upon consideration of the following detailed description and the attached drawings.

BRIEF DESCRIPTION OF THE DRAWINGS

FIG. 1.0 is an enlarged, sectional, fragmentary, and isometric view taken generally along the lines of 10-10 of FIG. 8;

FIG. 12 is an isometric fragmentary view of a third embodiment of a waveguide body having a stepped profile;

FIG. 13 is a plan view of the waveguide body of FIG. 12;

FIG. 14 is a sectional view taken generally along the lines 14-14 of FIG. 13;

FIG. 15 is a fragmentary, enlarged sectional view illustrating the waveguide body of FIGS. 12-14 in greater detail;

FIGS. 31-46 are isometric views of still further wave ides;

DETAILED DESCRIPTION OF THE PREFERRED EMBODIMENTS

Figure 1:
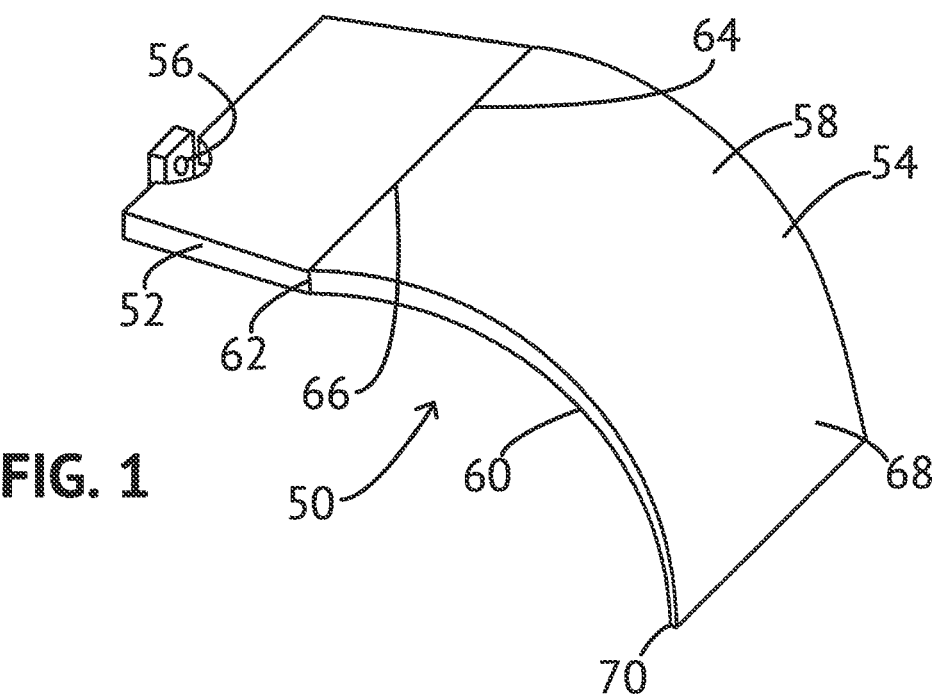
FIG. 1 is an isometric view of a first embodiment of a waveguide.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is, the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle greater than the critical angle and escape.

Tapering a waveguide body causes light to reflect internally along the length of the waveguide body while increasing the angle of incidence. Eventually, this light strikes one side at an angle that is acute enough to escape. The opposite example, i.e., a gradually thickening waveguide body over the length thereof, causes light to collimate along the length with fewer and fewer interactions with the waveguide body walls. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies contemplated herein are made of any suitable optically transmissive material, such as an acrylic material, a silicone, a polycarbonate, a glass material, or other suitable material(s) to achieve a desired effect and/or appearance.

As shown in FIGS. 1-3B, a first embodiment of a waveguide 50 comprises a coupling optic 52 attached to a main waveguide body 54. At least one light source 56, such as one or more LEDs, is disposed adjacent to the coupling optic 52. The light source 56 may be a white LED or may comprise multiple LEDs including a phosphor-coated LED either alone or in combination with a color LED, such as a green LED, etc. In those cases where a soft white illumination is to be produced, the light source 56 typically includes a blue shifted yellow LED and a red LED. Different color temperatures and appearances could be produced using other LED combinations, as is known in the art. In one embodiment, the light source 56 comprises any LED, for example, an MT-G LED incorporating TrueWhite® LED technology as developed and manufactured by Cree, Inc., the assignee of the present application.

The waveguide body 54 has a curved, tapered shape formed by a first surface 58 and a second surface 60. Light emitted from the light source 56 exits an output surface 62 of the coupling optic 52 and enters an input surface 64 at a first end 66 of the waveguide body 54. Light is emitted through the first surface 58 and reflected internally along the second surface 60 throughout the length of the waveguide body 54. The waveguide body 54 is designed to emit all or substantially all of the light from the first surface 58 as the light travels through the waveguide body 54. Any remaining light may exit the waveguide 54 at an end surface 70 located at a second end 68 opposite the first end 66. Alternatively, the end surface 70 may be coated with a reflective material, such as a white or silvered material to reflect any remaining light back into the waveguide body 54, if desired.

The curvature of the first surface 58 of the waveguide body 54 allows light to escape, whereas the curvature of the second surface 60 of the waveguide body 54 prevents the escape of light through total internal reflection. Specifically, total internal reflection refers to the internal reflection of light within the waveguide body that occurs when the angle of incidence of the light ray at the surface is less than a threshold referred to as the critical angle. The critical angle depends on the indices of refraction (N) of the material of which the waveguide body is composed and of the material adjacent to the waveguide body. For example, if the waveguide body is an acrylic material having an index of refraction of approximately 1.5 and is surrounded by air, the critical angle, $\theta_c$, is as follows:

$$\theta_c = \arcsin(N_{acrylic}/N_{air}) = \arcsin(1.5/1) = 41.8°$$

In the first embodiment, light is emitted through the first surface 58 of the waveguide body 54 in part due to the curvature thereof.

Figure 2:
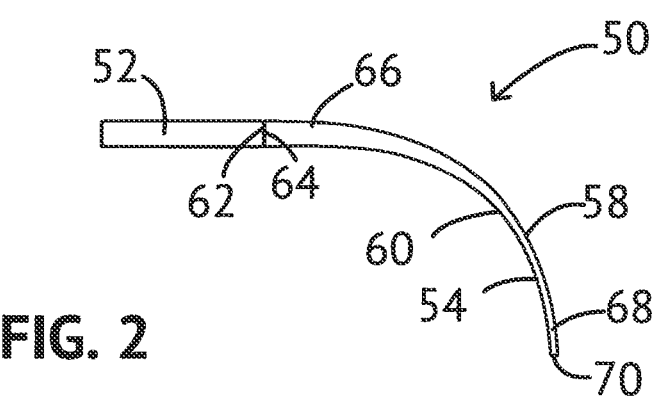
FIG. 2 is a side elevational view of the first embodiment of the waveguide.

As shown in FIGS. 1 and 2, the taper of the waveguide body 54 is linear between the input surface 64 and the end surface 70. According to one embodiment, a first thickness at the input surface 64 is 6 mm and a second thickness of the end surface is 2 mm. The radius of curvature of the first surface 58 is approximately 200 mm and the radius of the curvature of the second surface 60 is approximately 200 mm.

Figure 3A:
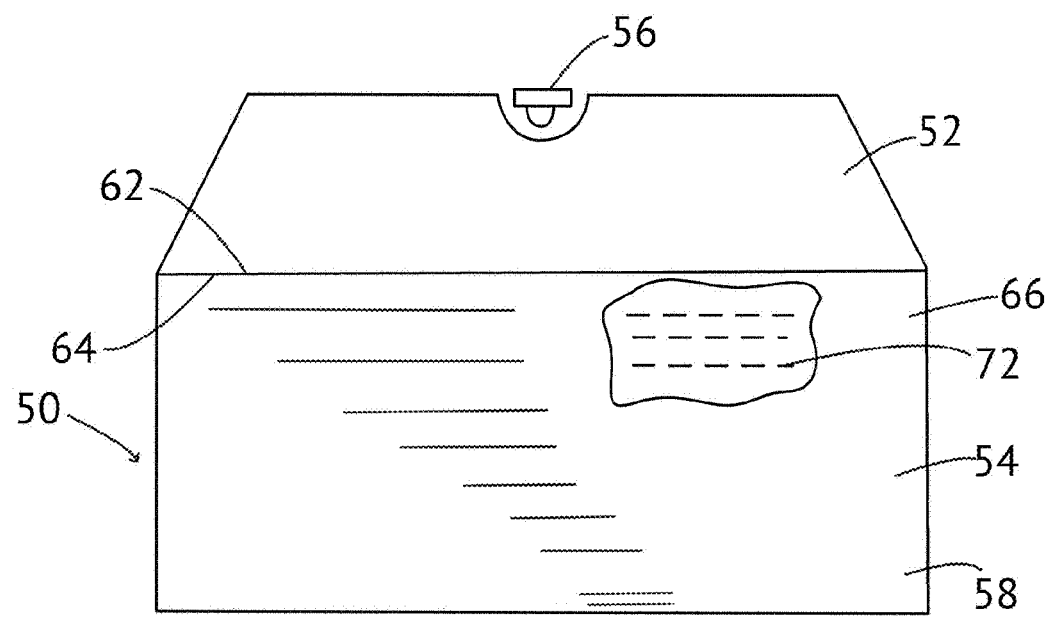
FIG. 3A is a plan view of the waveguide of FIG. 1.
Figure 3B:
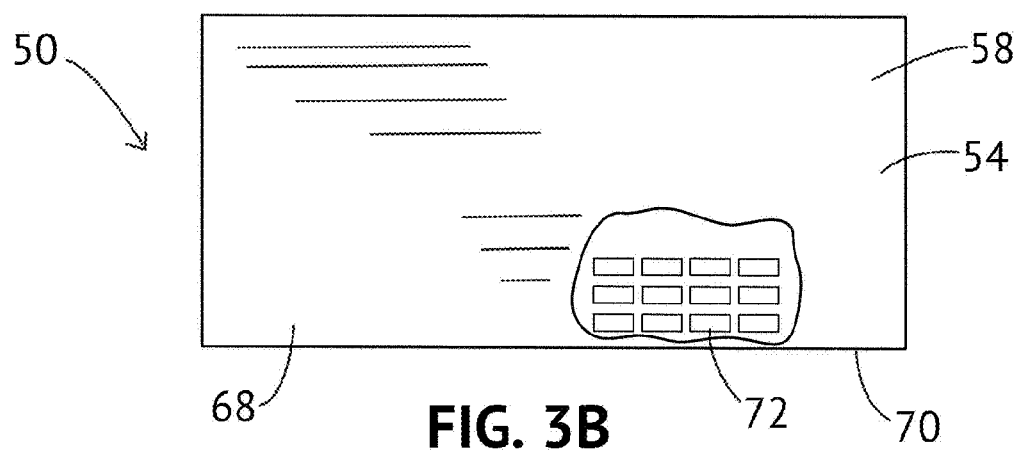
FIG. 3B is a front elevational view of the waveguide of FIG. 1.

Further, the number, geometry, and spatial array of optional extraction features across a waveguide body affects the uniformity and distribution of emitted light. As shown in the first embodiment of the waveguide body 54 in FIGS. 3A, 3B and 4-6, an array of discrete extraction features 72 having a variable extraction feature size is utilized to obtain a uniform or nearly uniform distribution of light. Specifically, the extraction features 72 are arranged in rows and columns wherein the features in each row extend left to right and the features in each column extend top to bottom as seen in FIGS. 3A and 3B. The extraction features 72 closest to the light source may be generally smaller and/or more widely spaced apart so that in the length dimension of the waveguide body 54 the majority of light travels past such features to be extracted at subsequent parts of the waveguide body 54. This results in a gradual extraction of light over the length of the waveguide body 54. The center-to-center spacing of extraction features 72 in each row are preferably constant, although such spacing may be variable, if desired. The extraction features 72 contemplated herein may be formed by injection molding, embossing, laser cutting, calender rolling, or the extraction features may added to the waveguide body 54 by a film.

Figure 4:
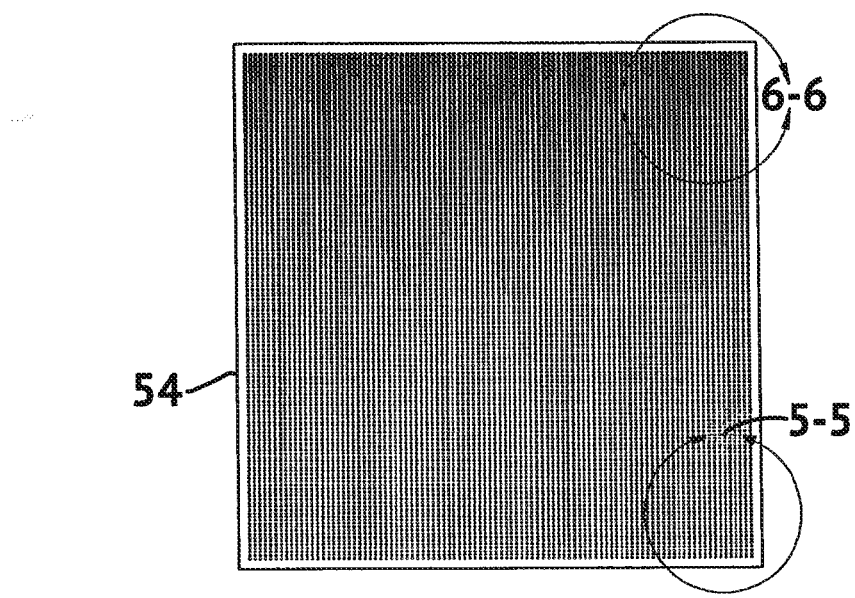
FIG. 4 is a front elevational view of the waveguide body of FIG. 1 shown flattened to illustrate the extraction features.
Figure 5:
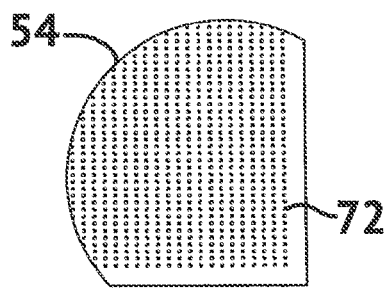
FIG. 5 is an enlarged fragmentary view of an area 5-5 of FIG. 3.
Figure 6:
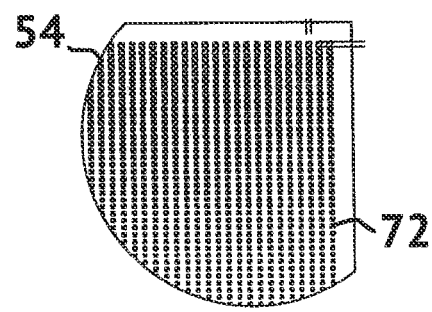
FIG. 6 is an enlarged fragmentary view of an area 6-6 of FIG. 3.
Figure 7:
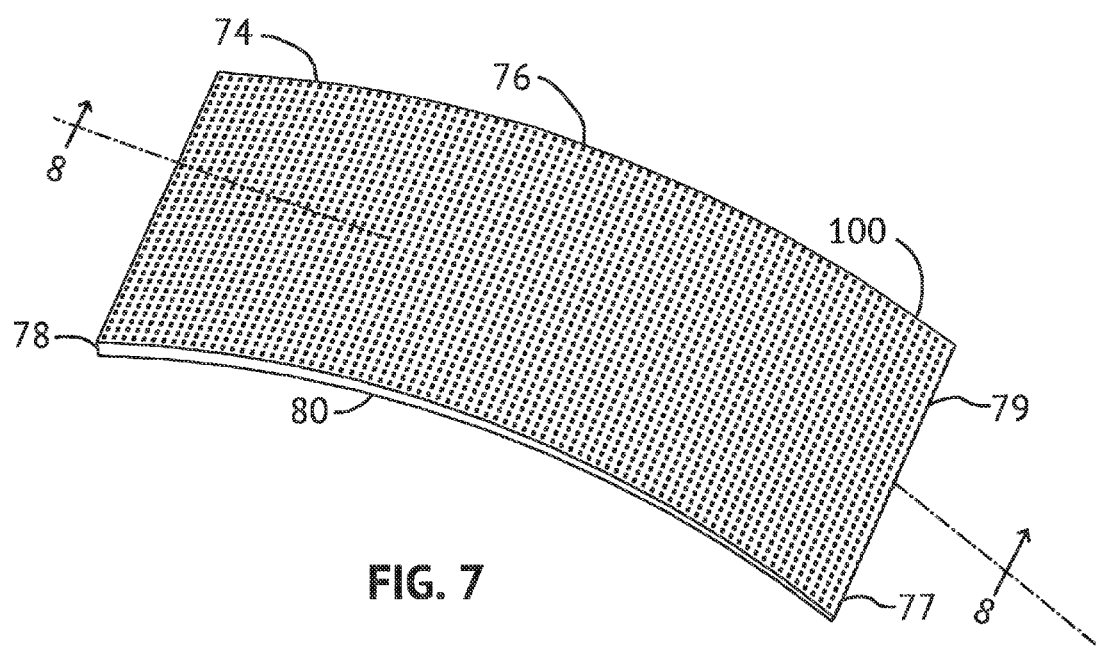
FIG. 7 is a side isometric view of a second embodiment of a waveguide body having a regular array of extraction features.
Figure 8:
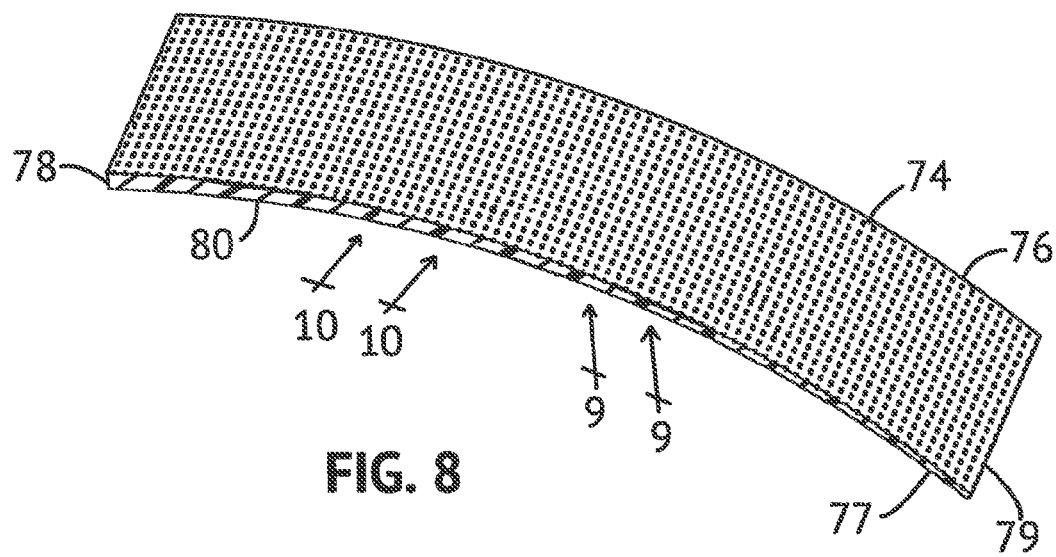
FIG. 8 is a sectional view taken generally along the lines 8-8 of FIG. 7.

Referring to FIGS. 3A and 3B, extraction features 72 on the first surface 58 of the waveguide body 54 permit the light rays to exit the waveguide body 54 because the angles of incidence of light rays at the surface of the extraction features 72 are greater than the critical angle. The change in size (and, optionally, spacing) of the extraction features 72 over the length of the waveguide body 54 results in a uniform or nearly uniform distribution of light emitted from the waveguide body 54 over the length and width thereof. Preferably, as seen in FIGS. 4 and 5, the extraction features 72 nearest the light source 56 are approximately 0.5 mm in width by 0.5 mm in length and 0.5 mm in depth. Also preferably, the extraction features at such location have a center-to-center spacing of about 2 mm. Still thither, as seen in FIGS. 4 and 6, the extraction features 72 farthest from the light source 56 are preferably approximately 1.4 mm (width) by 1.4 mm (length) by 1.4 mm (depth). In addition, the extraction features 72 at such location are also spaced apart about 2 mm (measured center-to-center). While the extraction features 72 are illustrated as having a constant spacing along the waveguide body 54, the features may instead have variable spacing as noted above. Thus, for example, the spacing between the features may decrease with distance from the light source 56. The increased size (and, possibly, density) of extraction features 72 as seen in FIG. 6 allows for the same amount of light to be emitted as the smaller extraction features 72 seen in FIG. 5. While a uniform distribution of light is desired in the first embodiment, other distributions of light may be contemplated and obtained using different arrays of extraction features.

Referring next to FIGS. 7-11, a further embodiment of a waveguide body 74 is illustrated. The waveguide body 74 is identical to the waveguide body 54, with the exception that the sizes and densities of extraction features 76 are constant along an outer surface 77. The waveguide body 74 further includes an input surface 78, an end surface 79 opposite the input surface 78, and an inner surface 80 and is adapted to be used in conjunction with any coupling optic and one or more light sources, such as the coupling optics disclosed herein and the LED 56 of the previous embodiment. The dimensions and shape of the waveguide body 74 are identical to those of the previous embodiment.

Figure 9:
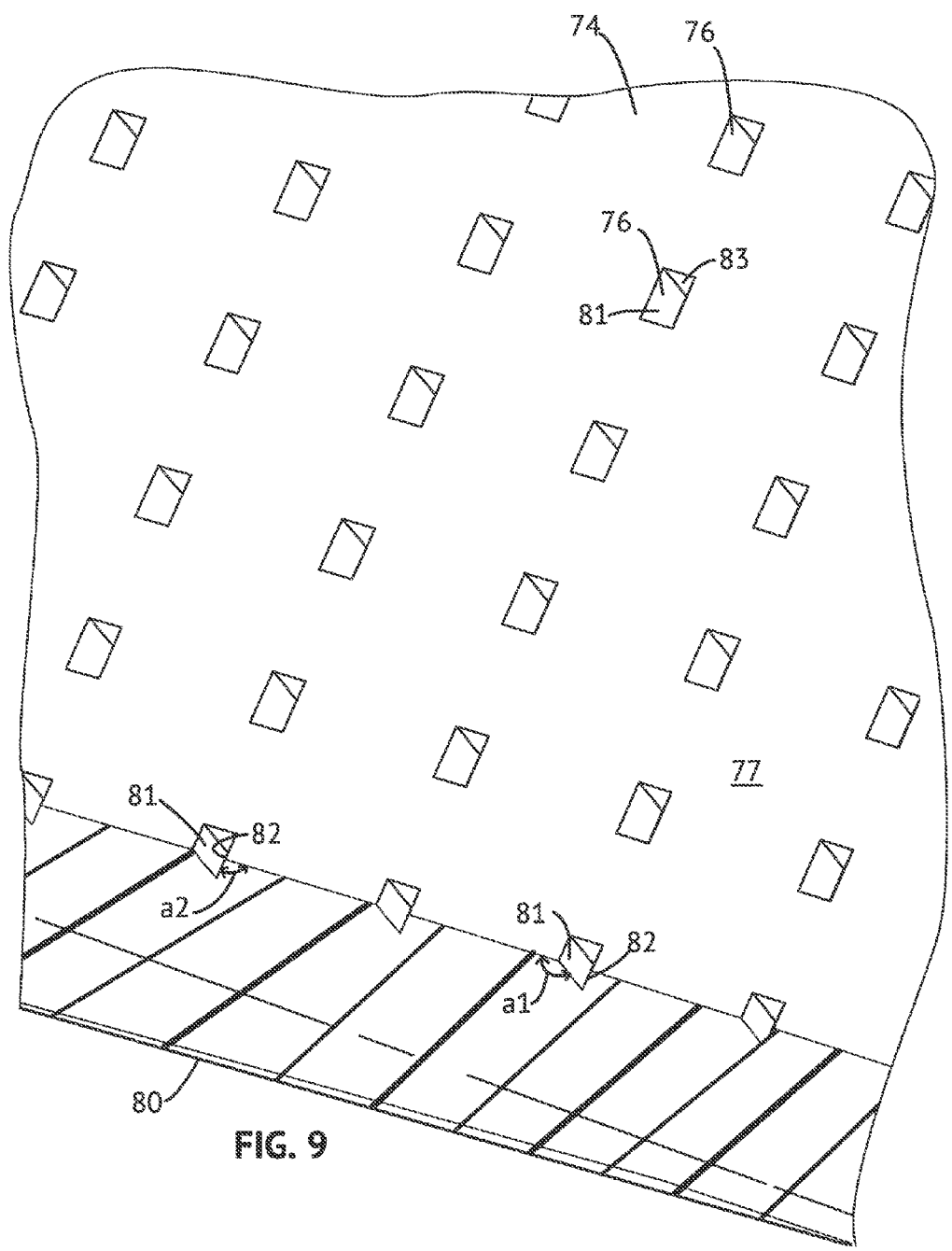
FIG. 9 is an enlarged, sectional, fragmentary, and isometric view taken along the lines of 9-9 in FIG. 8.
Figure 10:
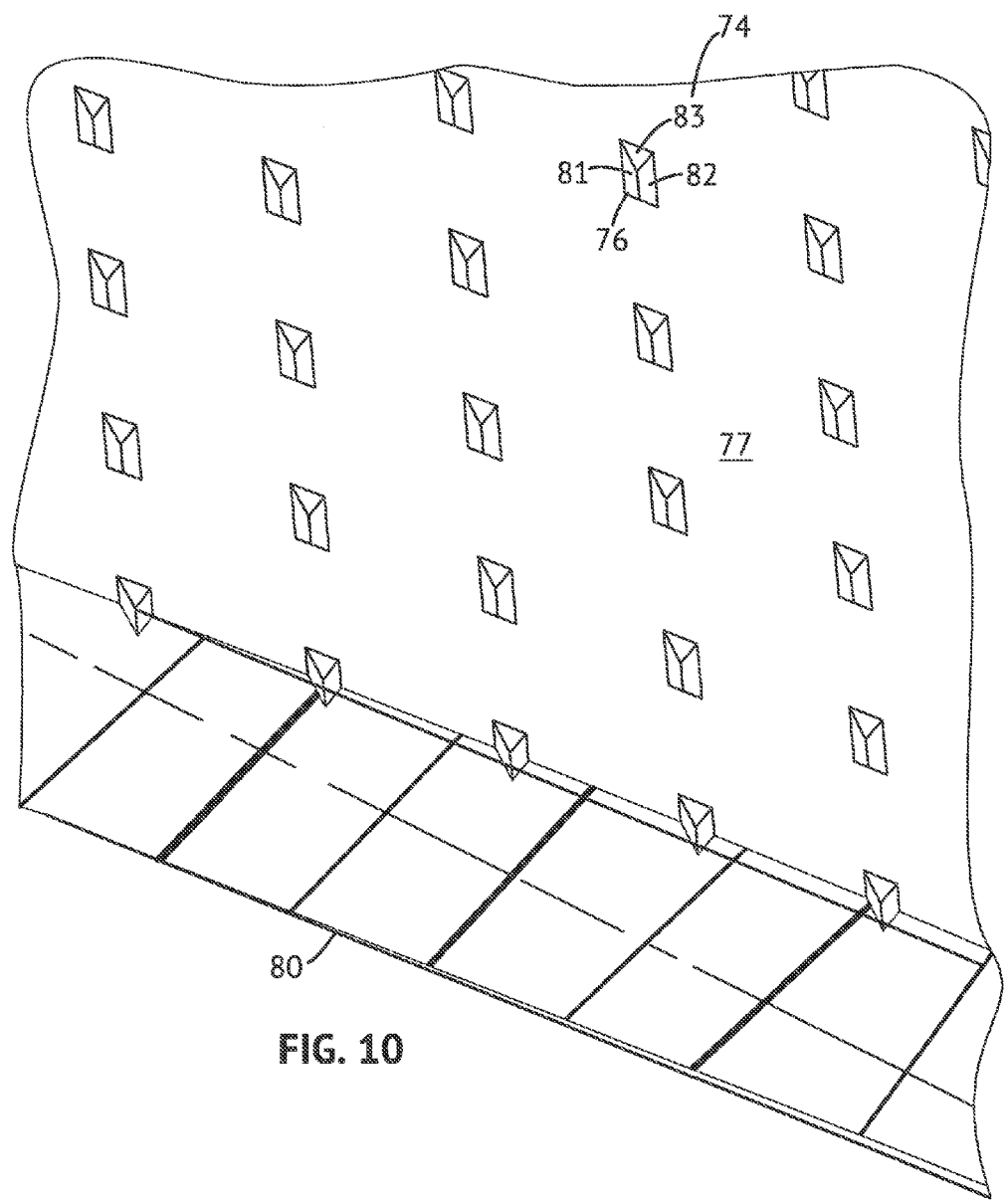
Figure 11:
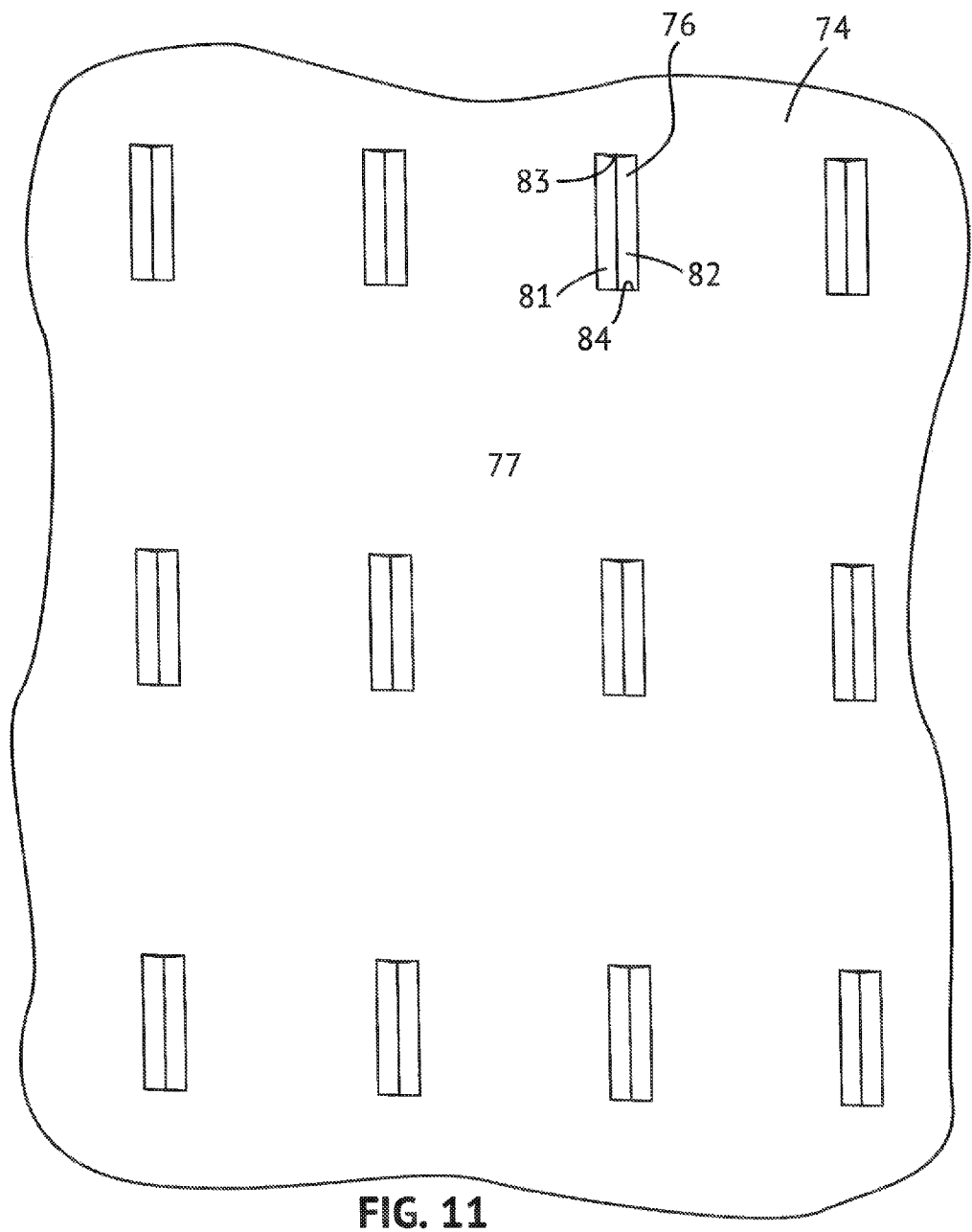
FIG. 11 is an enlarged, fragmentary plan view of several of the extraction features of FIG. 8.
Figure 17A:
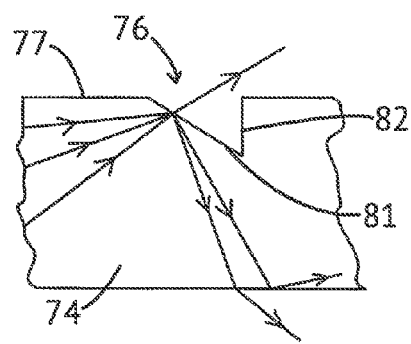
FIGS. 17A-17C are cross sectional views of uncoated, coated, and covered extraction features, respectively.

As seen in FIGS. 9-11, each extraction feature 76 comprises a V-shaped notch formed by flat surfaces 81, 82, End surfaces 83, 84 are disposed at opposing ends of the surfaces 81, 82. The end surfaces 83, 84 are preferably, although not necessarily, substantially normal to the surface 77. In one embodiment, as seen in FIG. 9, the surface 81 is disposed at an angle a1 with respect to the surface 77 whereas the surface 82 is disposed at an angle a2 with respect to the surface 77. While the angles a1 and a2 are shown as being equal or substantially equal to one another in FIGS. 9-11, the objective in a preferred embodiment is to extract all or substantially all light during a single pass through the waveguide body from the input surface 78 to the end surface 79. Therefore, light strikes only the surfaces 81, and little to no light strikes the surfaces 82. In such an embodiment the surfaces 81, 82 are be disposed at different angles with respect to the surface 77, such that a1 is about equal to 140 degrees and a2 is about equal to 95 degrees, as seen in FIG. 17A.

The extraction features 76 shown in FIGS. 9-11 may be used as the extraction features 72 of the first embodiment, it being understood that the size and spacing of the extraction features may vary over the surface 58, as noted previously. The same or different extraction features could be used in any of the embodiments disclosed herein as noted in greater detail hereinafter, either alone or in combination.

Referring to FIGS. 12-15, a third embodiment of a waveguide body 90 utilizes extraction features 92 in the form of a plurality of discrete steps 94 on a surface 98 of the waveguide body 90. The waveguide body 90 has an input surface 91 and an end surface 93. The steps 94 extend from side to side of the waveguide body 90 whereby the input surface 91 has a thickness greater than the thickness of the end surface 93. Any coupling optic, such as any of the coupling optics disclosed herein, may be used with the waveguide body 90, Light either refracts or internally reflects via total internal reflection at each of the steps 94. The waveguide body 90 may be flat (i.e., substantially planar) or curved in any shape, smooth or textured, and/or have a secondary optically refractive or reflective coating applied thereon. Each step 94 may also be angled, for example, as shown by the tapered surfaces 96 in FIG. 15, although the surfaces 96 can be normal to adjacent surfaces 98, if desired.

Figure 15A:
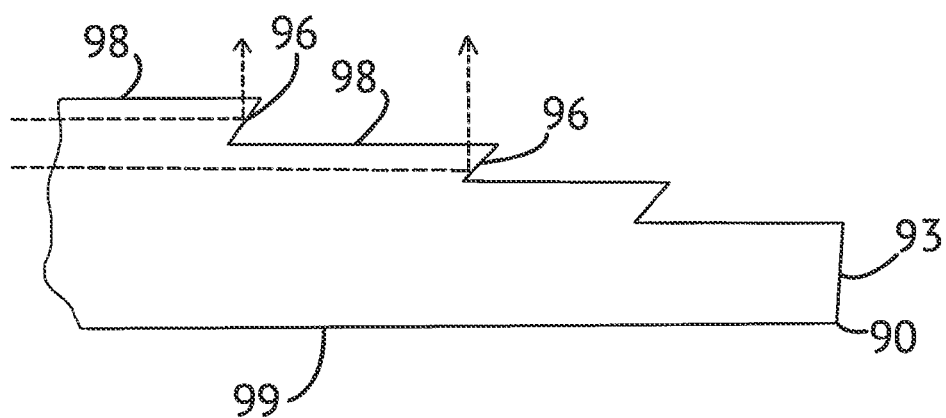
FIG. 15A is a view similar to FIG. 15 illustrating an alternative waveguide body.

FIG. 15A illustrates an embodiment wherein extraction features 92 include surfaces 96 that form an acute angle with respect to adjacent surfaces 98, contrary to the embodiment of FIG. 15. In this embodiment, the light rays traveling from left to right as seen in FIG. 15A are extracted out of the surface including the surfaces 96, 98 as seen in FIG. 15, as opposed to the lower surface 99 (seen in FIGS. 14 and 15).

Figure 49:
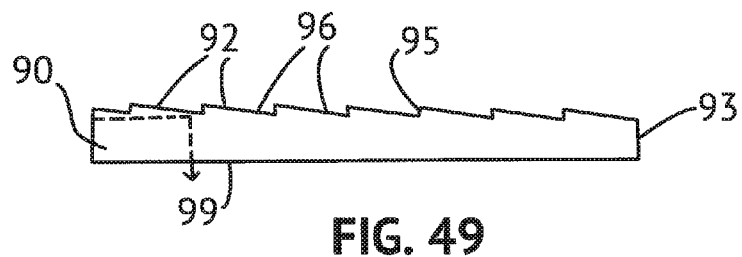
FIG. 49 is an enlarged fragmentary view of a portion of the waveguide body of FIG. 48 illustrated by the line 49-49.
Figure 47:
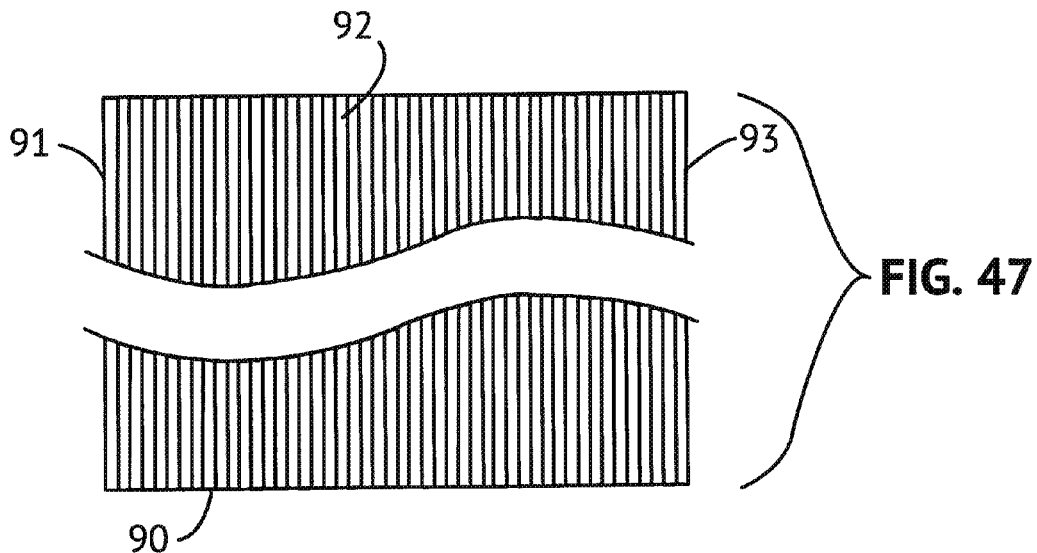
FIGS. 47 and 48 are plan and side views, respectively, of another waveguide body.
Figure 48:
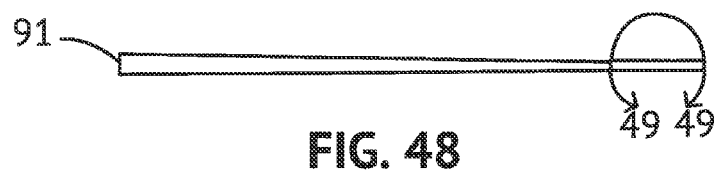

Yet another modification of the embodiment of FIGS. 12-15 is seen in FIGS. 47-49 wherein the tapered waveguide body 90 includes extraction features 92 having surfaces 96 separated from one another by intermediate step surfaces 95. The waveguide body 90 tapers from a first thickness at the input surface 91 to a second, lesser thickness at the end surface 93. Light is directed out of the lower surface 99.

Further, the steps 94 may be used in conjunction with extraction features 76 that are disposed in the surfaces 98 or even in each step 94. This combination allows for an array of equally spaced extraction features 72 to effect a uniform distribution of light. The changes in thickness allows for a distribution of emitted light without affecting the surface appearance of the waveguide.

Figure 16:
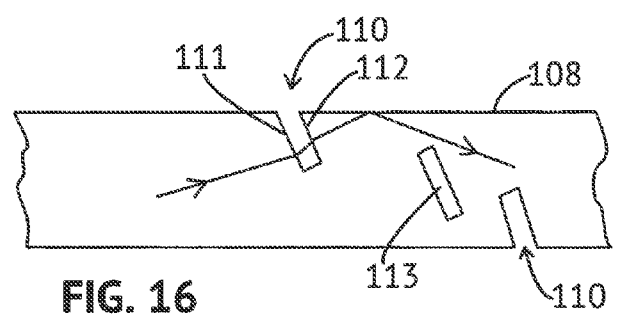
FIG. 16 is a cross sectional view of a waveguide body having slotted extraction features.
Figure 16A:
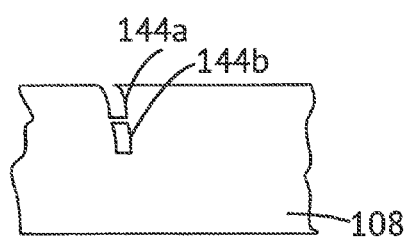
FIG. 16A is a view similar to FIG. 16 showing a segmented slotted extraction feature.

Extraction features may also be used to internally reflect and prevent the uncontrolled escape of light. For example, as seen in FIG. 17A, a portion of light that contacts a surface 81 of a typical extraction feature 76 escapes uncontrolled. FIG. 16 illustrates a waveguide body 108 having a slotted extraction feature 110 that redirects at least a portion of light that would normally escape back into the waveguide body 108. The slotted extraction feature 110 comprises a parallel-sided slot having a first side surface 111 and a second side surface 112. A portion of the light strikes the slotted extraction feature 110 at a sufficiently high angle of incidence that the light escapes through the first side surface 111. However, most of the escaped light reenters the waveguide body 108 through the second side surface 112. The light thereafter reflects off the outer surface of the waveguide body 108 and remains inside the body 108. The surface finish and geometry of the slotted extraction feature 110 affect the amount of light that is redirected back into the waveguide body 108. If desired, a slotted extraction feature 110 may be provided in upper and lower surfaces of the waveguide body 108. Also, while a flat slot is illustrated in FIG. 16, curved or segmented slots are also possible. For example, FIG. 16A illustrates a curved and segmented slot comprising slot portions 114a, 114b. Parallel slotted extraction features may be formed within the waveguide as well as at the surface thereof, for example, as seen at 113 in FIG. 16. Any of the extraction features disclosed herein may be used in or on any of the waveguide bodies disclosed herein. The extraction features may be equally or unequally sized, shaped, and/or spaced in and/or on the waveguide body.

Figure 17B:
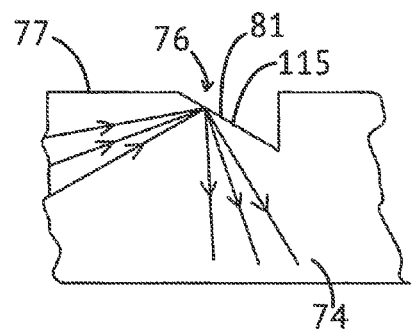
Figure 17C:
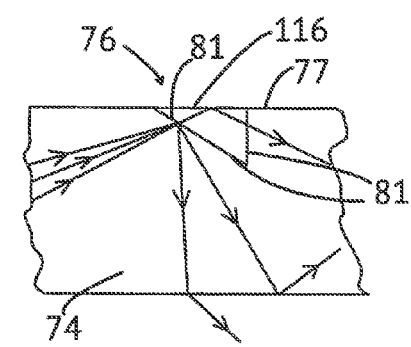

In addition to the extraction features 72, 76, 94, 110, 113, and/or 114, light may be controlled through the use of discrete specular reflection. An extraction feature intended to reflect light via total internal reflection is limited in that any light that strikes the surface at an angle greater than the critical angle will escape uncontrolled rather than be reflected internally. Specular reflection is not so limited, although specular reflection can lead to losses due to absorption. The interaction of light rays and extraction features 102 with and without a specular reflective surface is shown in FIGS. 17A-17C. FIG. 17A shows the typical extraction feature 76 with no reflective surface. FIG. 17B shows a typical extraction feature 76 with a discrete reflective surface 115 formed directly thereon. The discrete reflective surface 115 formed on each extraction feature 76 directs any light that would normally escape through the extraction feature 76 back into the waveguide body 74. FIG. 17C shows an extraction feature 76 with a discrete reflective surface 116 having an air gap 117 therebetween. In this embodiment, light either reflects off the surface 81 back into the waveguide body 74 or refracts out of the surface 81. The light that does refract is redirected back into the waveguide body 74 by the reflective surface 116 after traveling through the air gap 117. The use of non-continuous reflective surfaces localized at points of extraction reduces the cost of the reflective material, and therefore, the overall cost of the waveguide. Specular reflective surfaces can be manufactured by deposition, bonding, co-extrusion with extraction features, insert molding, vacuum metallization, or the like.

Figure 18:
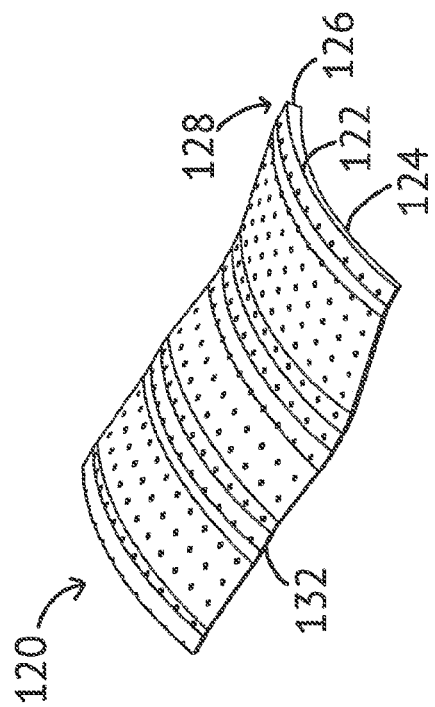
FIG. 18 is an isometric view of a further embodiment of a waveguide body.
Figure 19:
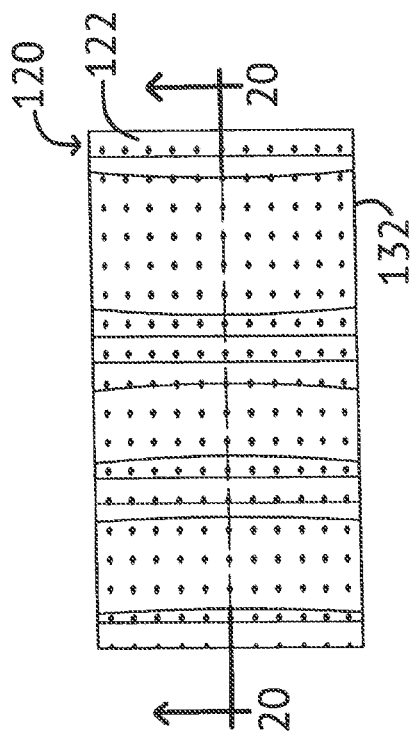
FIG. 19 is plan view of the waveguide body of FIG. 18.
Figure 20:
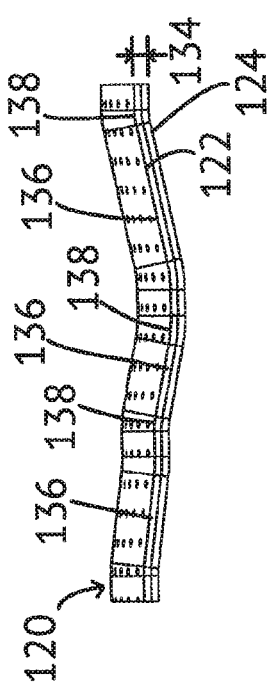
FIG. 20 is a side elevational view of the waveguide body of FIG. 18.

Referring to FIGS. 18-20, a further embodiment of a waveguide body 120 includes a curved, tapered shape formed by a first surface 122 and a second surface 124. Similar to the first embodiment of the waveguide 54, light enters an input surface 126 at a first end 128 of the waveguide 120. Light is emitted through the first surface 122 and reflected internally along the second surface 124 throughout the length of the waveguide body 120. The waveguide body 120 is designed to emit all or substantially all of the light from the first surface 122 as the light travels through the waveguide body 120. Thus, little or no light is emitted out an end face 132 opposite the first end 128.

FIG. 20 shows a cross-section of the waveguide 120 body taken along the width thereof. The distance 134 between the first and second surfaces 122, 124 is constant along the width. The first and second surfaces 122, 124 have a varied contour that comprises linear portions 136 and curved portions 138. The waveguide body 120 has a plurality of extraction features 140 that are equally or unequally spaced on the surface 122 and/or which are of the same or different size(s) and/or shape(s), as desired. As noted in greater detail hereinafter, the embodiment of FIGS. 18-20 has multiple inflection regions that extend transverse to the general path of light through the input surface 126. Further, as in all the embodiments disclosed herein, that waveguide body is made of an acrylic material, a silicone, a polycarbonate, a glass material, or the like.

Figure 21:
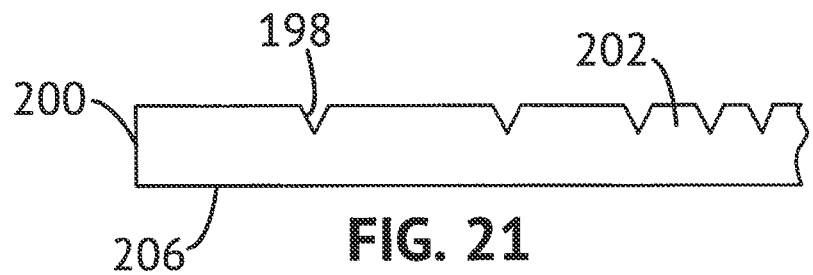
FIG. 21 is a side elevational view of another waveguide body.
Figure 22:
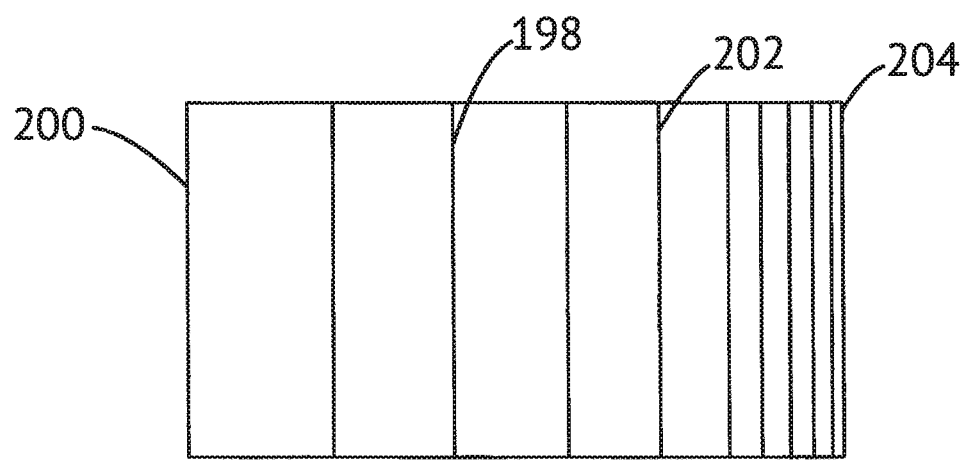
FIG. 22 is a plan view of the waveguide body of FIG. 21.

FIGS. 21 and 22 illustrate yet another embodiment wherein a series of parallel, equally-sized linear extraction features 198 are disposed in a surface 199 at varying distances between an input surface 200 of a waveguide body 202. Each of the extraction features 198 may be V-shaped and elongate such that extraction features 198 extend from side to side of the waveguide body 202. The spacing between the extraction features 198 decreases with distance from the input surface 200 such that the extraction features are closest together adjacent an end surface 204. The light is extracted out of a surface 206 opposite the surface 199.

Figure 23:
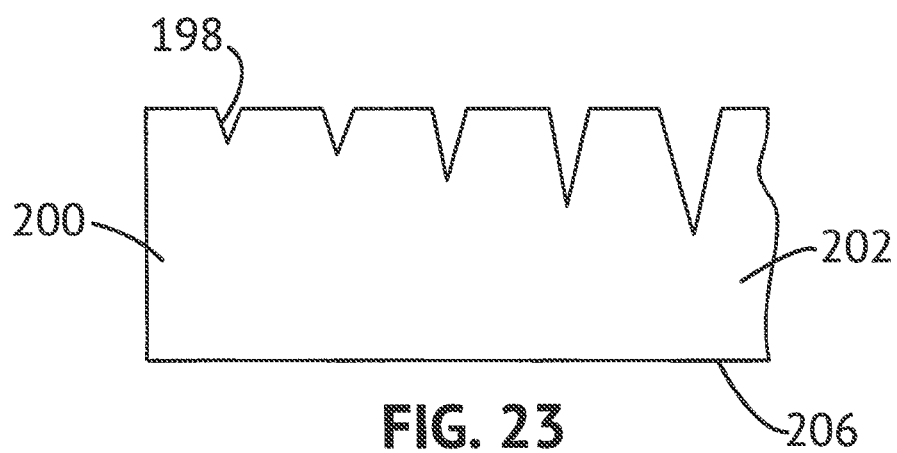
FIG. 23 is a side elevational view of yet another waveguide body.

FIG. 23 illustrates an embodiment identical to FIGS. 21 and 22, with the exception that the waveguide features 198 are equally spaced and become larger with distance from the input face 200. If desired, the extraction features 198 may be unequally spaced between the input and end surfaces 200, 204, if desired. As in the embodiment of FIGS. 21 and 22, light is extracted out of the surface 206.

FIGS. 24-27 illustrate yet another embodiment of a waveguide body 240 having an input surface 242, an end surface 244, and a J-shaped body 246 disposed between the surfaces 242, 244. The waveguide body 240 may be of constant thickness as seen in FIGS. 24-27, or may have a tapering thickness such that the input surface 242 is thicker than the end surface 244. Further, the embodiment of FIGS. 24-27 is preferably of constant thickness across the width of the body 240, although the thickness could vary along the width, if desired. One or more extraction features may be provided on an outer surface 248 and or an inner surface 250, if desired, although it should be noted that light injected into the waveguide body 240 escapes the body 240 through the surface 248 due to the curvature thereof.

Figure 28:
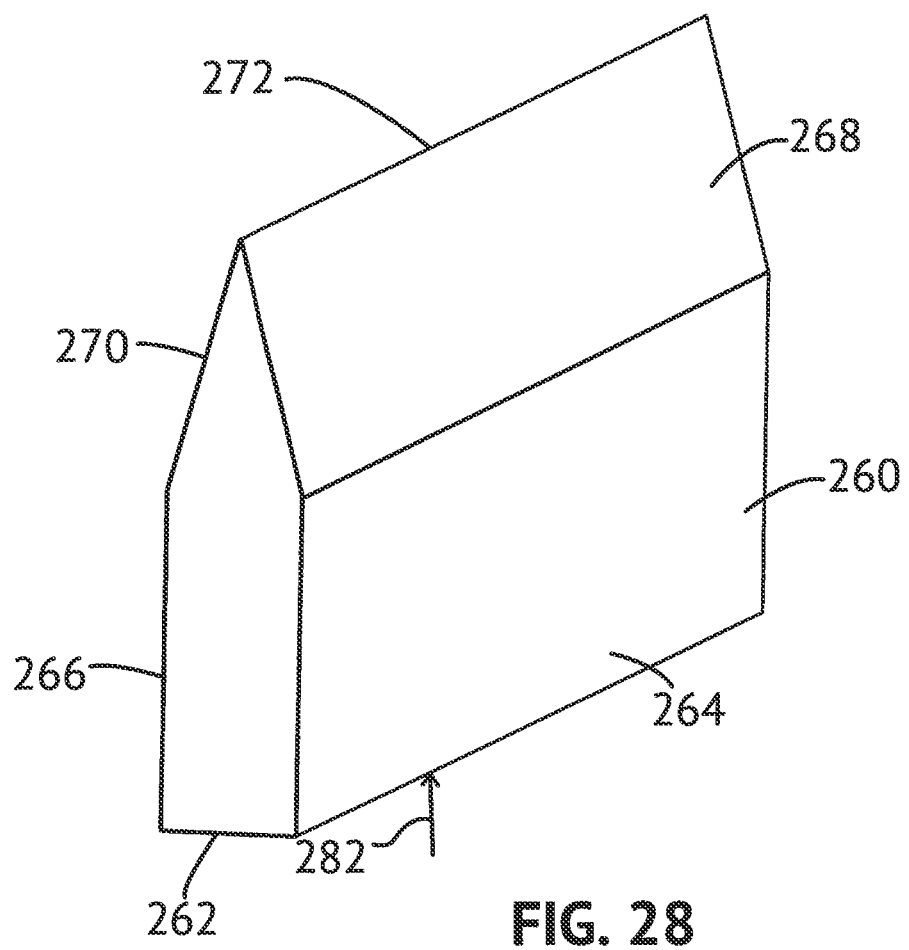
FIGS. 28-30 are isometric, side elevational, and front elevational views of another waveguide body.
Figure 29:
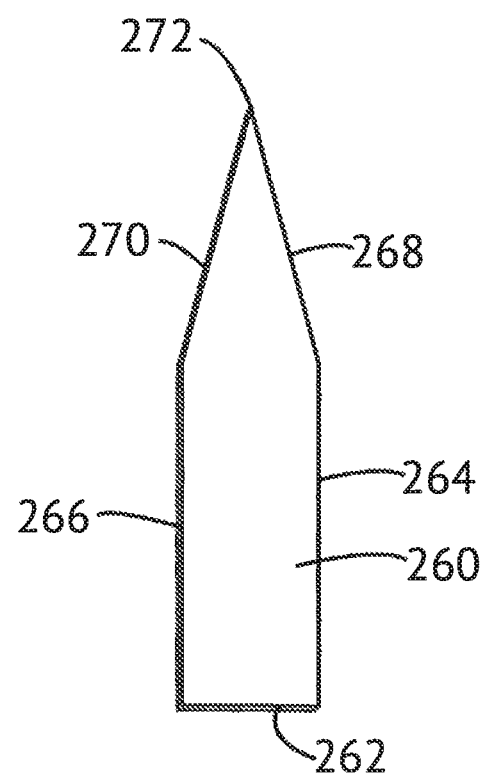
Figure 30:
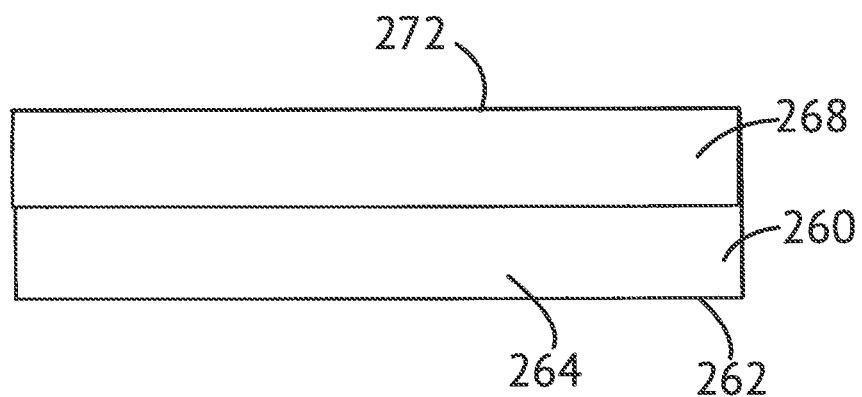

FIGS. 28-30 illustrate a still further embodiment of a waveguide 260 including an input surface 262. The waveguide body 260 further includes first and second parallel surfaces 264, 266 and beveled surfaces 268, 270 that meet at a line 272. Light entering the input surface 262 escapes through the surfaces 268, 270.

Figure 31:
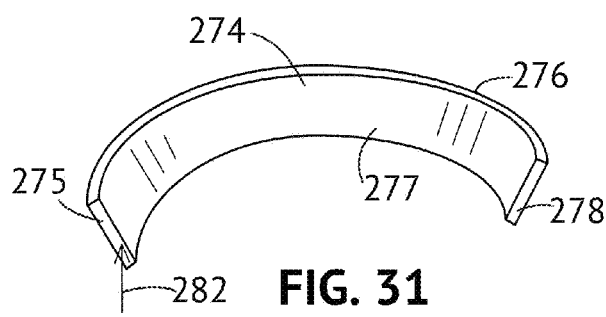

A further embodiment comprises the curved waveguide body 274 of FIG. 31. Light entering an input surface 275 travels through the waveguide body 274 and is directed out an outer surface 276 that is opposite an inner surface 277. As in any of the embodiments disclosed herein, the surfaces 276, 277 may be completely smooth, and/or may include one or more extraction features as disclosed herein. Further, the waveguide body may have a constant thickness (i.e. the dimension between the faces 276, 277) throughout, or may have a tapered thickness between the input surface 275 and an end surface 278, as desired. As should be evident from an inspection of FIG. 31, the waveguide body 274 is not only curved in one plane, but also is tapered inwardly from top to bottom (i.e., transverse to the plane of the curve of the body 274) as seen in the FIG.

Figure 33:
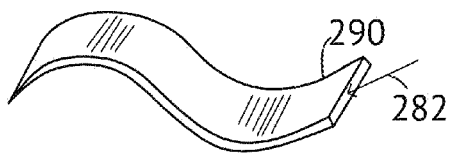
Figure 35:
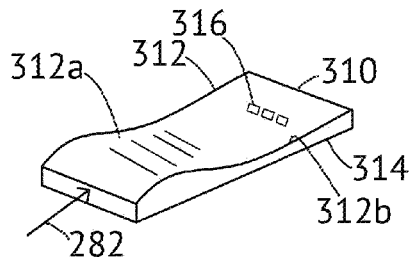
Figure 32:
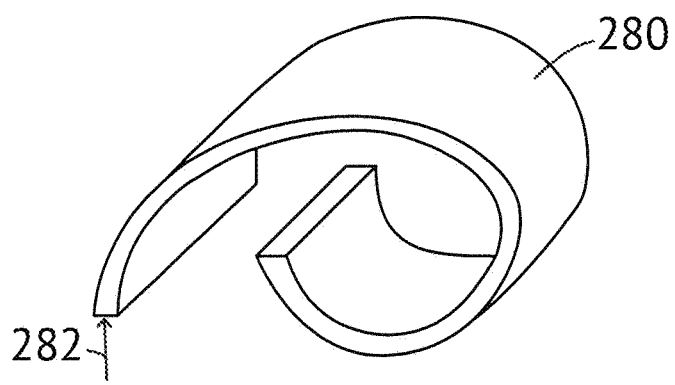
Figure 25:
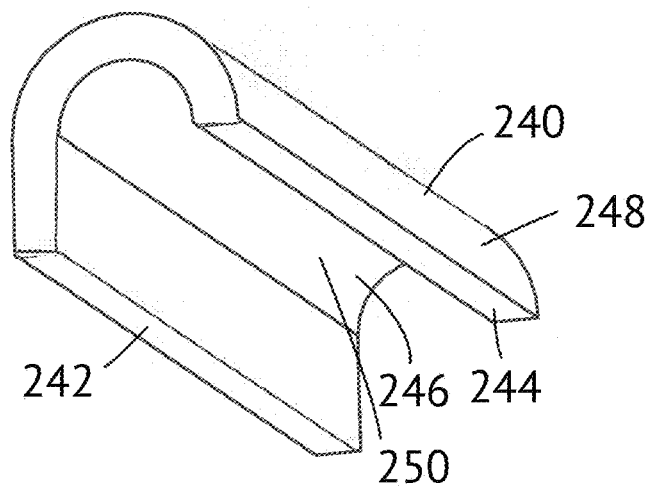
Figure 34:
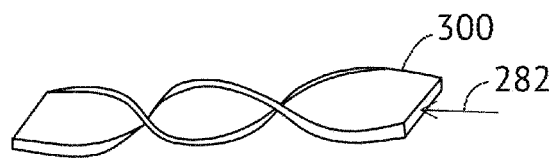

In the case of an arc of constant radius, a large portion of light is extracted at the beginning of the arc, while the remaining light skips along the outside surface. If the bend becomes sharper with distance along the waveguide body, a portion of light is extracted as light skips along the outside surface. By constantly spiraling the arc inwards, light can be extracted out of the outer face of the arc evenly along the curve. Such an embodiment is shown by the spiral-shaped waveguide body 280 of FIG. 32 (an arrow 282 illustrates the general direction of light entering the waveguide body 280 and the embodiments shown in the other FIGS.). These same principles apply to S-bends and arcs that curve in two directions, like a corkscrew. For example, an S-shaped waveguide body 290 is shown in FIG. 33 and a corkscrew-shaped waveguide body 300 is shown in FIG. 34. Either or both of the waveguide bodies is of constant cross sectional thickness from an input surface to an end surface or is tapered between such surfaces. The surfaces may be smooth and/or may include extraction features as disclosed herein. The benefit of these shapes is that they produce new geometry to work with, new ways to create a light distribution, and new ways to affect the interaction between the waveguide shape and any extraction features.

FIGS. 35-46 illustrate further embodiments of waveguide bodies 310, 320, 330, 340, 350, 360, 370, 380, 390, 400, and 410, respectively, wherein curvature, changes in profile and/or cross sectional shape and thickness are altered to create a number of effects. The waveguide body 310 is preferably, although not necessarily, rectangular in cross sectional shape and has a curved surface 312 opposite a flat surface 314. The curved surface 312 has multiple inflection regions defining a convex surface 312*a* and a convex surface 312*b*. Both of the surfaces 312, 314 may be smooth and/or may have extraction features 316 disposed therein (as may all of the surfaces of the embodiments disclosed herein.) Referring to FIGS. 36 and 37, the waveguide bodies 320, 330 preferably, although not necessarily, have a rectangular cross sectional shape, and may include two sections 322, 324 (FIG. 36) or three or more sections 332, 334, 336 (FIG. 37) that are disposed at angles with respect to one another. FIG. 38 illustrates the waveguide body 340 having a base portion 342 and three curved sections 344*a*-344*c* extending away from the base portion 342. The cross sections of the base portion 342 and the curved portions 344 are preferably, although not necessarily, rectangular in shape.

Figure 39:
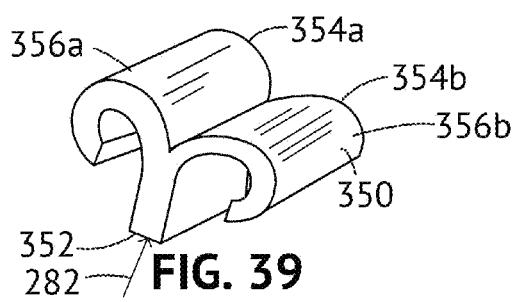
Figure 24:
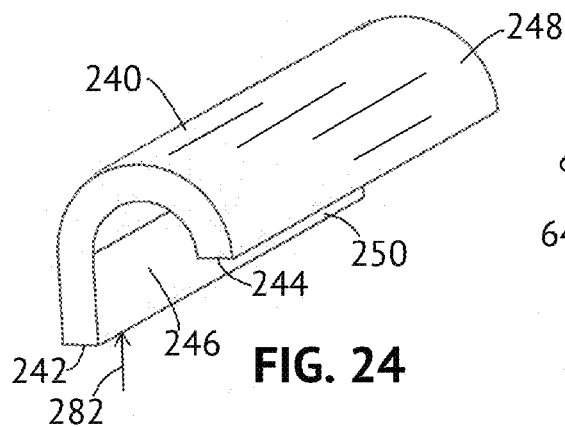
FIGS. 24-27 are upper isometric, lower isometric, side elevational, and rear elevational views, respectively, of a still further waveguide body.

FIGS. 39 and 40 illustrate waveguide bodies 350 and 360 that include base portions 352, 362, respectively. The waveguide body 350 of FIG. 39 includes diverging sections 354a, 354b having outer surfaces 356a, 356b extending away from the base portion 352 that curve outwardly in convex fashion. The waveguide body 360 of FIG. 40 includes diverging sections 364a, 364b having outer surfaces 366a, 366b that curve outwardly in convex and concave fashion.

Figure 43:
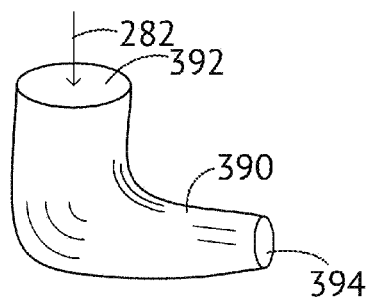

The waveguide bodies 370, 380, and 390 of FIGS. 41-43 all have circular or elliptical cross sectional shapes. The waveguide bodies 370, 380 have two sections 372, 374 (FIG. 41) or three or more sections 382, 384, 386 (FIG. 42). The waveguide body 390 of FIG. 43 preferably, although not necessarily, has a circular or elliptical cross sectional shape and, like any of the waveguide bodies disclosed herein (or any section or portion of any of the waveguide bodies disclosed herein) tapers from an input surface 392 to an output surface 394.

Figure 44:
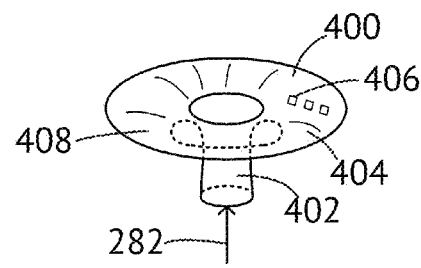
Figure 44A:
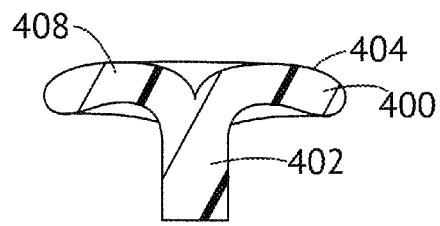
FIG. 44A is a sectional view of the waveguide body of FIG. 44.

The waveguide body 400 of FIGS. 44 and 44A is substantially mushroom-shaped in cross section comprising a base section 402 that may be circular in cross section and a circular cap section 404. Extraction features 406 may be provided in the cap section 404. Light may be emitted from a cap surface 408.

Figure 45:
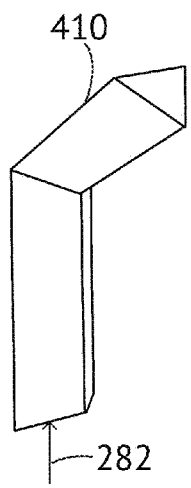
Figure 26:
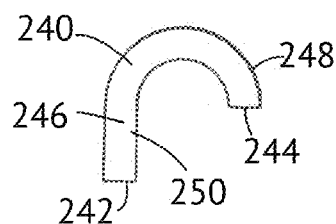
Figure 45A:
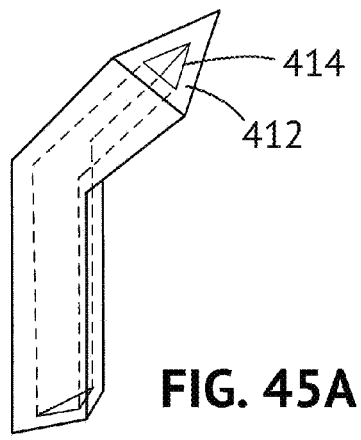
FIG. 45A is an isometric view of a hollow waveguide body.
Figure 27:
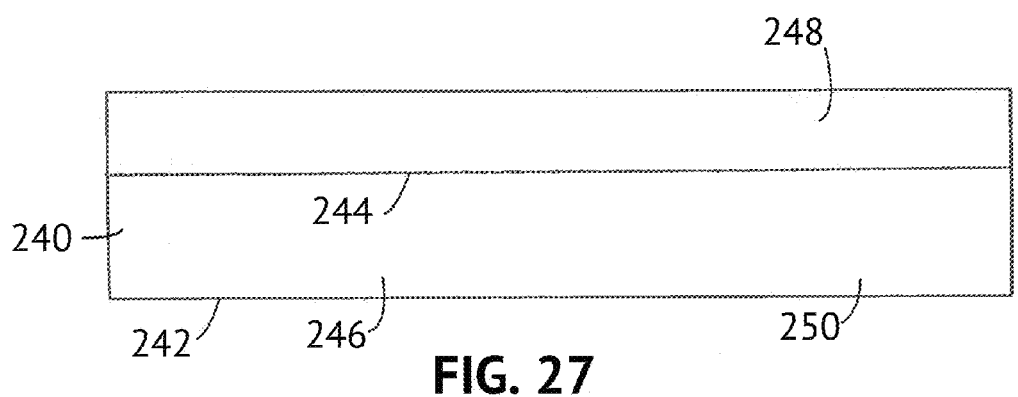
Figure 46:
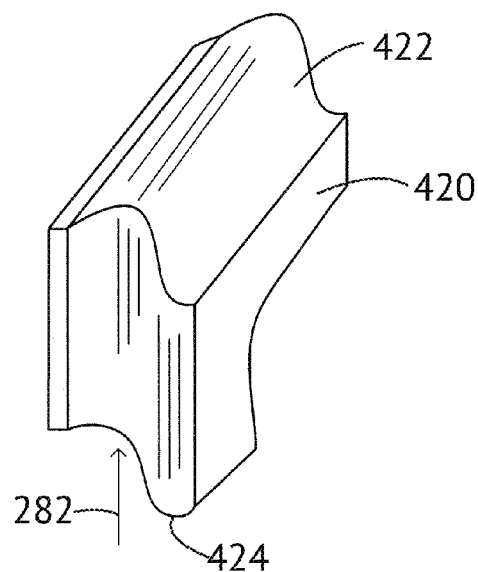

FIGS. 45 and 46 illustrate that the cross sectional shape may be further varied, as desired. Thus, for example, the cross sectional shape may be triangular as illustrated by the waveguide body 410 or any other shape. If desired, any of the waveguide bodies may be hollow, as illustrated by the waveguide body 412 seen in FIG. 45A, which is identical to the waveguide body 410 of FIG. 45 except that a triangular recess 414 extends fully therethrough. FIG. 46 illustrates substantially sinusoidal outer surfaces 422, 424 defining a complex cross sectional shape.

Figure 50:
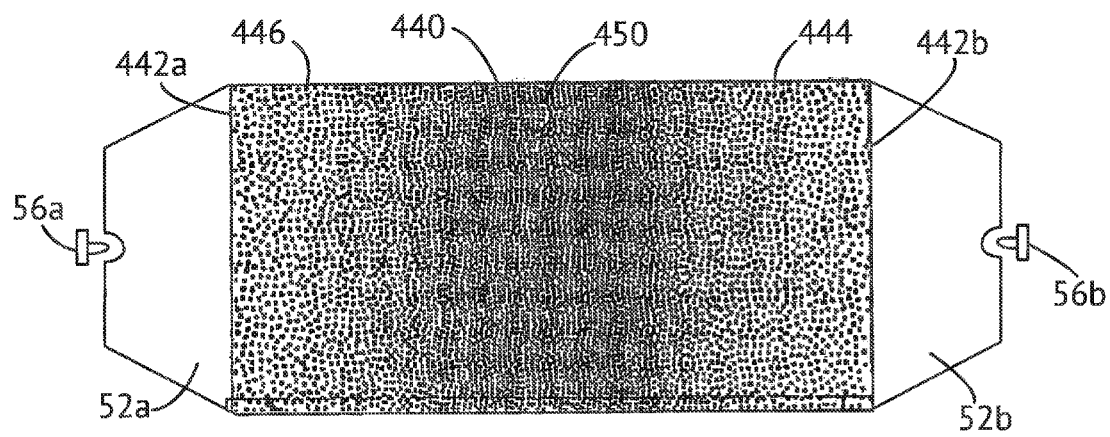
FIGS. 50 and 51 are plan and fragmentary sectional views of yet another waveguide body.
Figure 51:
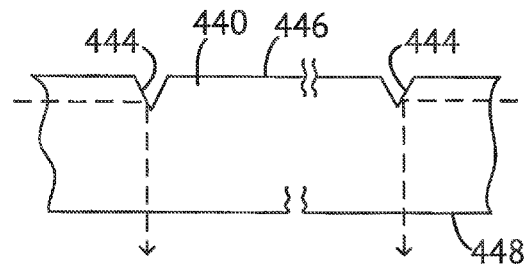

FIG. 50 illustrates a waveguide body 440 that is preferably, although not necessarily, planar and of constant thickness throughout. Light is directed into opposing input surfaces 442a, 442h and transversely through the body 440 by first and second light sources 56a, 56b, each comprising, for example, one or more LEDs, and coupling optics 52a, 52b, respectively, which together form a waveguide. Extraction features 444, which may be similar or identical to the extraction features 76 or any of the other extraction features disclosed herein, are disposed in a surface 446. As seen in FIG. 51 light developed by the light sources 56a, 56b is directed out a surface 448 opposite the surface 446. As seen in FIG. 50, the density and/or sizes of the extraction features 444 are relatively low at areas near the input surfaces 442a, 442b and the density and/or sizes are relatively great at an intermediate area 450. Alternatively, or in addition, the shapes of the extraction features may vary over the surface 446. A desired light distribution, such as a uniform light distribution, is thus obtained.

As in other embodiments, extraction features may be disposed at other locations, such as in the surface 448, as desired.

Figure 52:
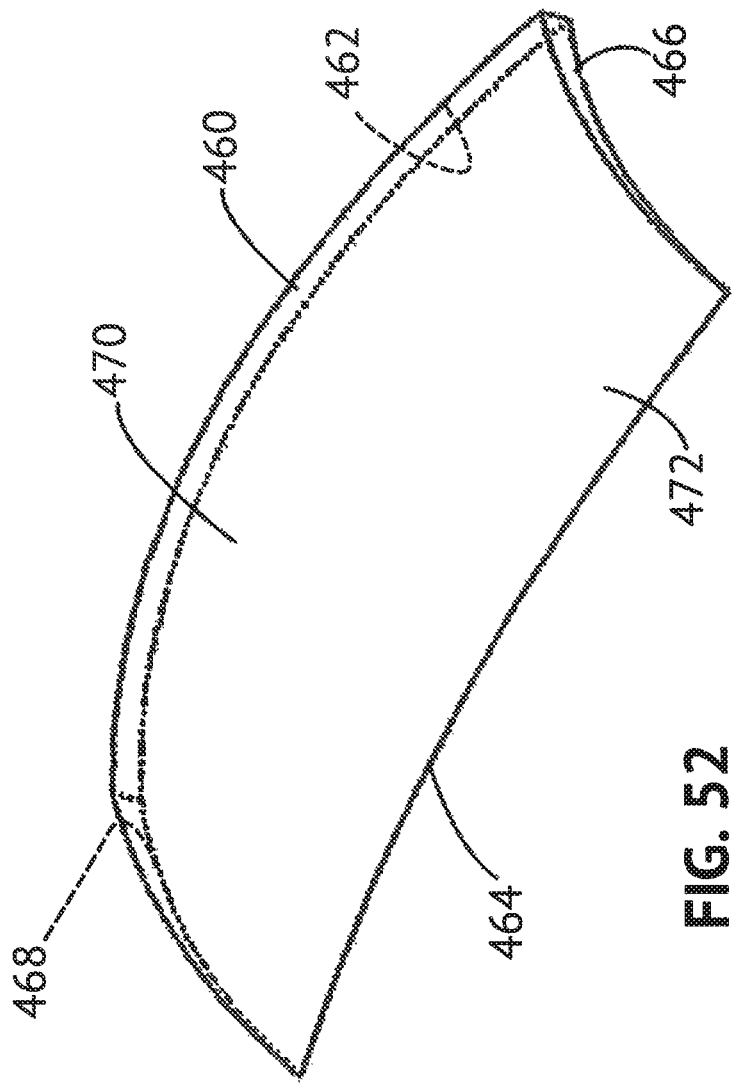
FIG. 52 is an isometric view of another waveguide body that is curved in two dimensions.

FIG. 52 illustrates a waveguide body 460 that is curved in two dimensions. Specifically, the body 460 is curved not only along the length between an input surface 462 and an end surface 464, but also along the width between side surfaces 466, 468. Preferably, although not necessarily, the waveguide body is also tapered between the input surface 462 and the end surface 464, and is illustrated as having smooth surfaces, although one or more extraction features may be provided on either or both of opposed surfaces 470, 472.

Figure 55:
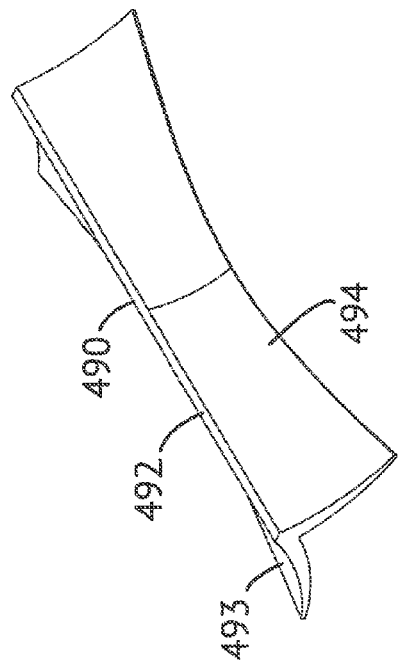
FIGS. 53-55 are front, bottom, and side elevational views of another waveguide body.
Figure 54:
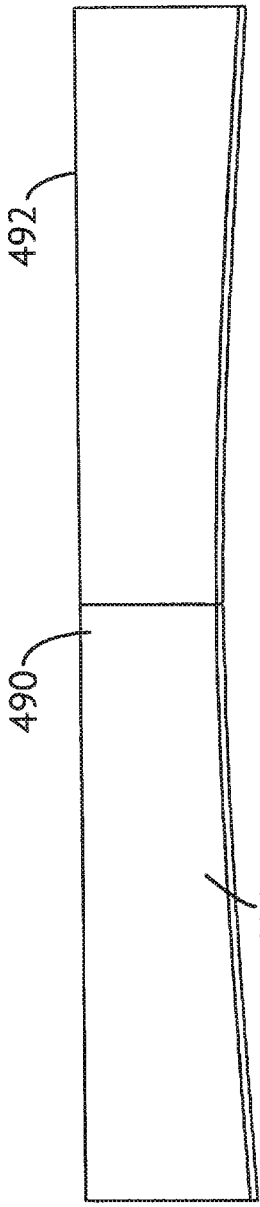
Figure 53:
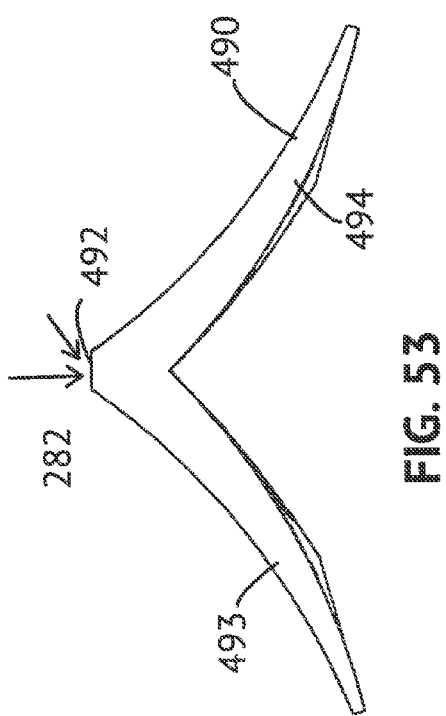

FIGS. 53-55 illustrate a waveguide body 490 that is also curved in multiple dimensions. An input surface 492 is disposed at a first end and light is transmitted into first and second (or more) sections 493, 494. Each section 493, 494 is tapered and is curved along the length and width thereof. Light is directed out of the waveguide body 490 downwardly as seen in FIG. 53.

Figure 57:
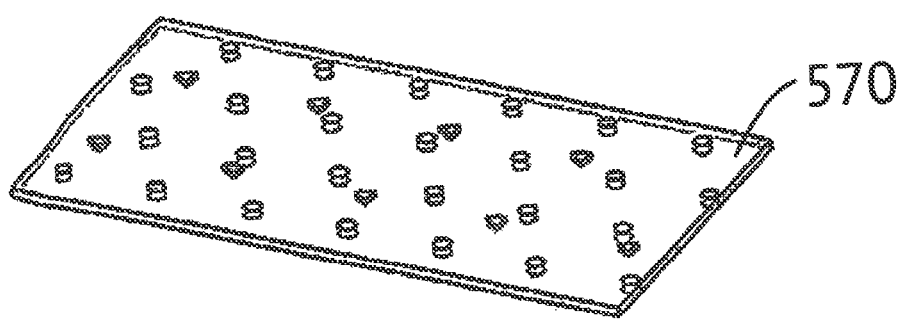
FIG. 57 is an isometric view of a waveguide body utilizing at least some of the extraction features of FIG. 56.
Figure 56:
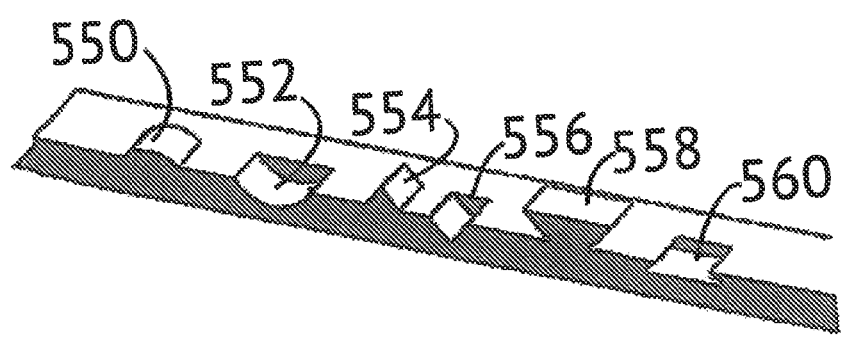
FIG. 56 is an isometric view of alternative extraction features.

FIG. 56 illustrates various alternative extraction feature shapes. Specifically, extraction features 550, 552 comprise convex and concave rounded features, respectively. Extraction features 554, 556 comprise outwardly extending and inwardly extending triangular shapes, respectively (the extraction feature 556 is similar or identical to the extraction feature 76 described above). Extraction features 558, 560 comprise outwardly extending and inwardly extending inverted triangular shapes, respectively. FIG. 57 shows a waveguide body 570 including any or all of the extraction features 550-560. The sizes and/or density of the features may be constant or variable, as desired.

Alternatively or in addition, the extraction features may have any of the shapes of copending U.S. patent application Ser. No. 13/840,563, entitled "Optical Waveguide and Lamp Including Same", owned by the assignee of the present application and filed contemporaneously with the present application, the disclosure of which is expressly incorporated by reference herein.

Figure 17D:
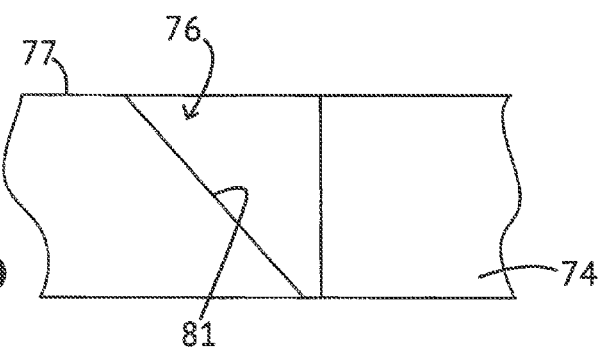

If desired, one or more extraction features may extend fully through any of the waveguide bodies described herein, for example, as seen in FIG. 17D. Specifically, the extraction feature 76 may have a limited lateral extent (so that the physical integrity of the waveguide body is not impaired) and further may extend fully through the waveguide body 74. Such an extraction feature may be particularly useful at or near an end surface of any of the waveguide bodies disclosed herein.

Figure 60:
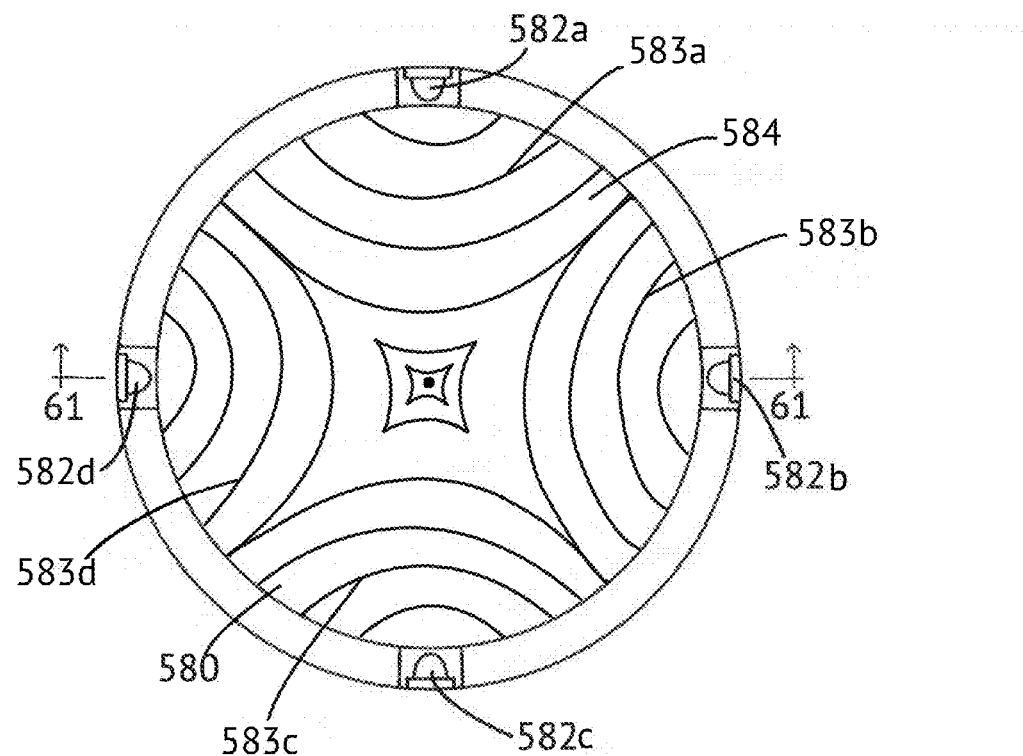
FIG. 60 is a diagrammatic plan view of another waveguide body.
Figure 61:
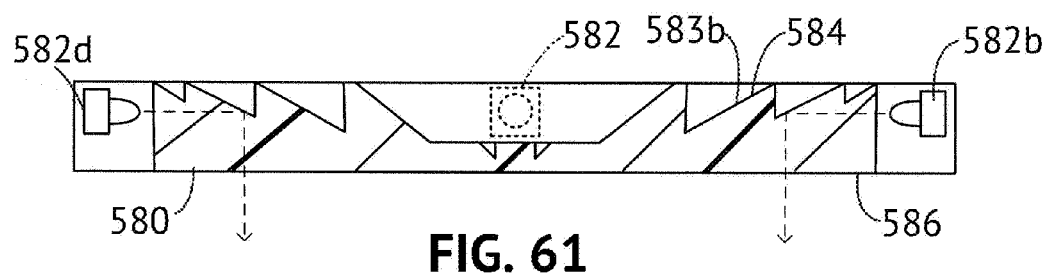
FIG. 61 is a sectional view taken generally along the lines 61-61 of FIG. 60.

Referring next to FIGS. 60 and 61, a further embodiment comprises a waveguide body 580 and a plurality of light sources that may comprise LEDs 582a-582d. While four LEDs are shown, any number of LEDs may be used instead. The LEDs 582 direct light radially into the waveguide body 580. In the illustrated embodiment, the waveguide body 580 is circular, but the body 580 could be any other shape, for example as described herein, such as square, rectangular, curved, etc. As seen in FIG. 61, and as in previous embodiments, the waveguide body 580 includes one or more extraction features 583 arranged in concentric and coaxial sections 583a-583d about the LEDs to assist in light extraction. The extraction features are similar or identical to the extraction features of copending U.S. patent application Ser. No. 13/840,563, entitled "Optical Waveguide and Lamp Including Same", incorporated by reference herein. Light extraction can occur out of one or both of opposed surfaces 584, 586. Still further, the surface 586 could be tapered and the surface 584 could be flat, or both surfaces 584, 586 may be tapered or have another shape, as desired.

Figure 62:
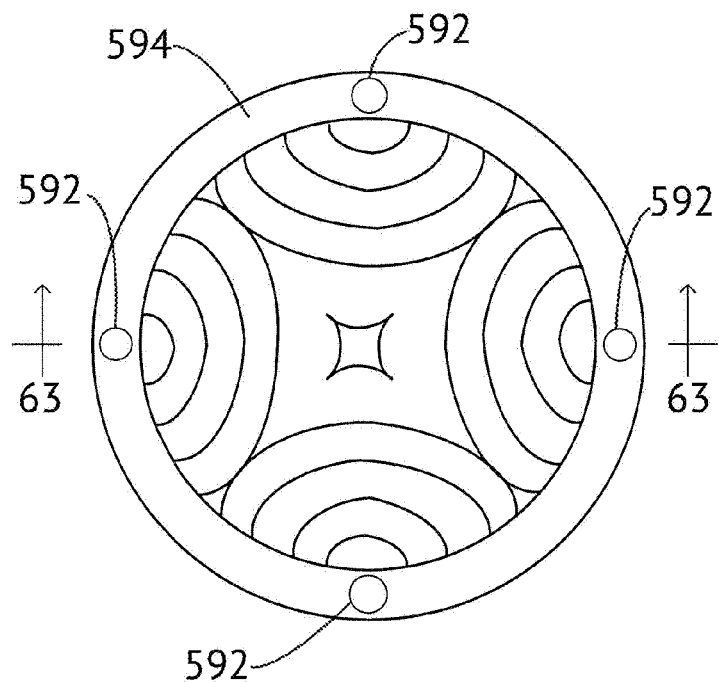
FIG. 62 is a diagrammatic plan view of a still further waveguide body.
Figure 63:
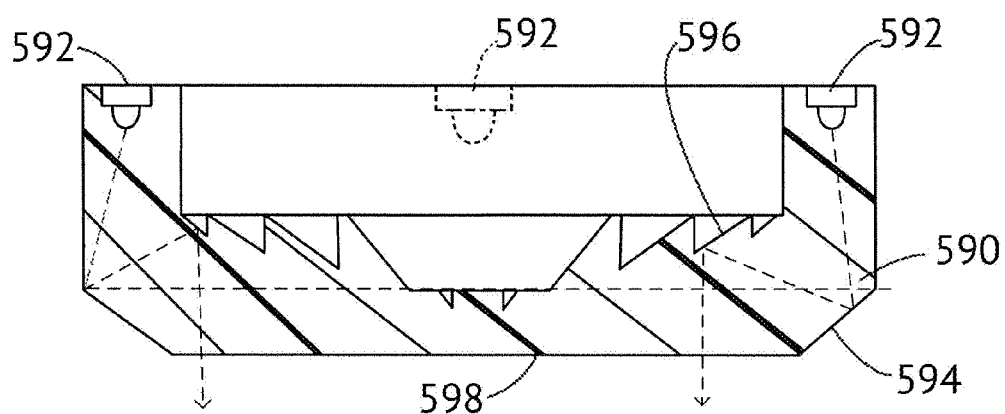
FIG. 63 is a sectional view taken generally along the lines 63-63 of FIG. 62.

FIGS. 62 and 63 illustrate yet another waveguide body 590 and a plurality of light sources that may comprise LEDs 592a-592d. While four LEDs 592 are shown, any number of LEDs may be used instead. In the illustrated embodiment, the waveguide body 590 is circular in shape, but may be any other shape, including the shapes disclosed herein. The light developed by the LEDs is directed axially downward as seen in FIG. 63. The downwardly directed light is diverted by a beveled surface 594 of the waveguide body 590 radially inwardly by total internal reflection. The waveguide body 590 includes one or more extraction features 595 similar or identical to the extraction features of FIGS. 60 and 61 arranged in concentric and coaxial sections 595a-595d relative to the LEDs 592a-592d, also as in the embodiment of FIGS. 62 and 63, Light is directed by the extraction features 595 out one or both opposed surfaces 596, 598. If desired, the surface 598 may be tapered along with the surface 596 and/or the surface 596 may be flat, as desired.

Figure 64:
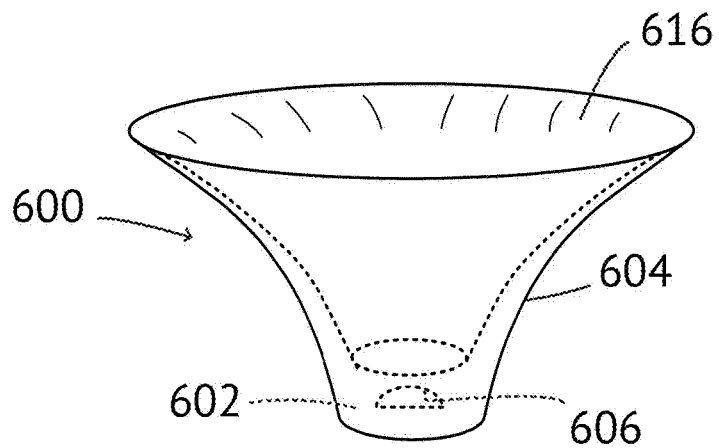
FIG. 64 is an isometric view of yet another waveguide body.
Figure 65:
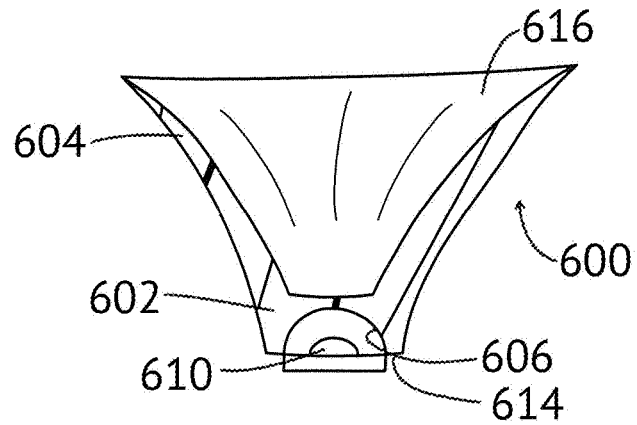
FIG. 65 is a cross sectional view of the waveguide body of FIG. 64.

A still further embodiment of a waveguide body 600 is shown in FIGS. 64 and 65. The body 600 has a base portion 602 and an outwardly flared main light emitting portion 604. The base portion may have an optional interior coupling cavity 606 comprising a blind bore within which is disposed one or more light sources in the form of one or more LEDs 610 (FIG. 65). If desired, the interior coupling cavity 606 may be omitted and light developed by the LEDs 610 may be directed through an air gap into a planar or otherwise shaped input surface 614. The waveguide body 600 is made of any suitable optically transmissive material, as in the preceding embodiments. Light developed by the LED's travels through the main light emitting portion 604 and out an inner curved surface 616.

Figure 66:
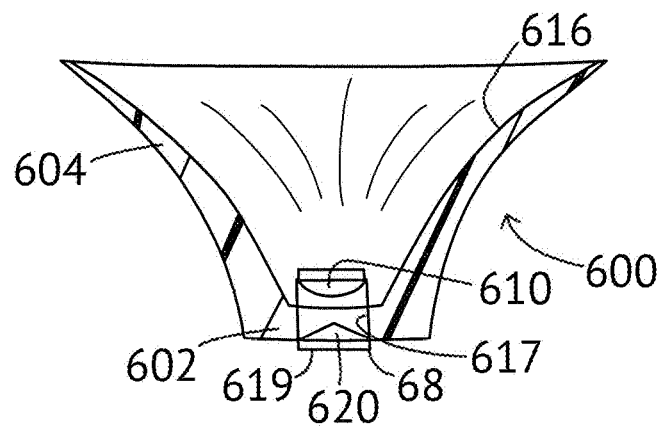
FIG. 66 is a cross sectional view of a still further waveguide body.

FIG. 66 illustrates an embodiment identical to FIGS. 64 and 65 except that the interior coupling cavity comprises a bore 617 that extends fully through the base portion 602 and the one or more light sources comprising one or more LEDs 610 extend into the bore 617 from an inner end as opposed to the outside end shown in FIGS. 64 and 65. In addition, a light diverter comprising a highly reflective conical plug member 618 is disposed in the outside end of the bore 617. The plug member 618 may include a base flange 619 that is secured by any suitable means, such as an adhesive, to an outer surface of the waveguide body 600 such that a conical portion 620 extends into the bore 617. If desired, the base flange 619 may be omitted and the outer diameter of the plug member 618 may be slightly greater than the diameter of the bore 617 whereupon the plug member 618 may be press fitted or friction fitted into the bore 617 and/or secured by adhesive or other means. Still further, if desired, the conical plug member 618 may be integral with the waveguide body 600 rather than being separate therefrom. Further, the one or more LEDs 610 may be integral with the waveguide body 600, if desired. In the illustrated embodiment, the plug member 618 may be made of white polycarbonate or any other suitable material, such as acrylic, molded silicone, polytetrafluoroethylene (PTFE), or Delrin® acetyl resin. The material may be coated with reflective silver or other metal or material using any suitable application methodology, such as a vapor deposition process.

Light developed by the one or more LEDs is incident on the conical portion 620 and is diverted transversely through the base portion 602. The light then travels through the main light emitting portion 604 and out the inner curved surface 616. Additional detail regarding light transmission and extraction is provided in copending U.S. patent application Ser. No. 13/840,563, entitled "Optical Waveguide and Lamp Including Same", incorporated by reference herein.

In either of the embodiments shown in FIGS. 64-66 additional extraction features as disclosed herein may be disposed on any or all of the surfaces of the waveguide body 600.

Figure 67:
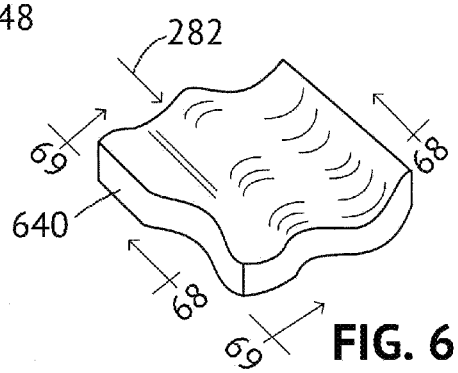
FIG. 67 is an isometric view of yet another waveguide body having inflection points along the path of light therethrough.
Figure 68:
FIG. 68 is a cross sectional view taken generally along the lines 68-68 of FIG. 67.
Figure 69:
FIG. 69 is a side elevational view taken generally along the view lines 69-68 of FIG. 67.

Other shapes of waveguide bodies and extraction features are possible. Combining these shapes stacks their effects and changes the waveguide body light distribution further. In general, the waveguide body shapes disclosed herein may include one or multiple inflection points or regions where a radius of curvature of a surface changes either abruptly or gradually. In the case of a waveguide body having multiple inflection regions, the inflection regions may be transverse to the path of light through the waveguide body (e.g., as seen in FIGS. 18-20), along the path of light through the waveguide body (e.g., shown in FIG. 33), or both (e.g., as shown by the waveguide body 640 of FIGS. 67-69 or by combining waveguide bodies having both inflection regions). Also, successive inflection regions may reverse between positive and negative directions (e.g., there may be a transition between convex and concave surfaces), Single inflection regions and various combinations of multiple inflection regions, where the inflection regions are along or transverse to the path of light through the waveguide body or multiple waveguide bodies are contemplated by the present invention.

Referring again to FIGS. 1 and 3A, light developed by the one or more LEDs 56 is transmitted through the coupling optic 52. If desired, an air gap is disposed between the LED(s) 56 and the coupling optic 52. Any suitable apparatus may be provided to mount the light source 56 in desired relationship to the coupling optic 52. The coupling optic 52 mixes the light as close to the light source 56 as possible to increase efficiency, and controls the light distribution from the light source 56 into the waveguide body. When using a curved waveguide body as described above, the coupling optic 52 can control the angle at which the light rays strike the curved surface(s), which results in controlled internal reflection or extraction at the curved surface(s).

If desired, light may be alternatively or additionally transmitted into the coupling optic 52 by a specular reflector at least partially or completely surrounding each or all of the LEDs.

Figure 58:
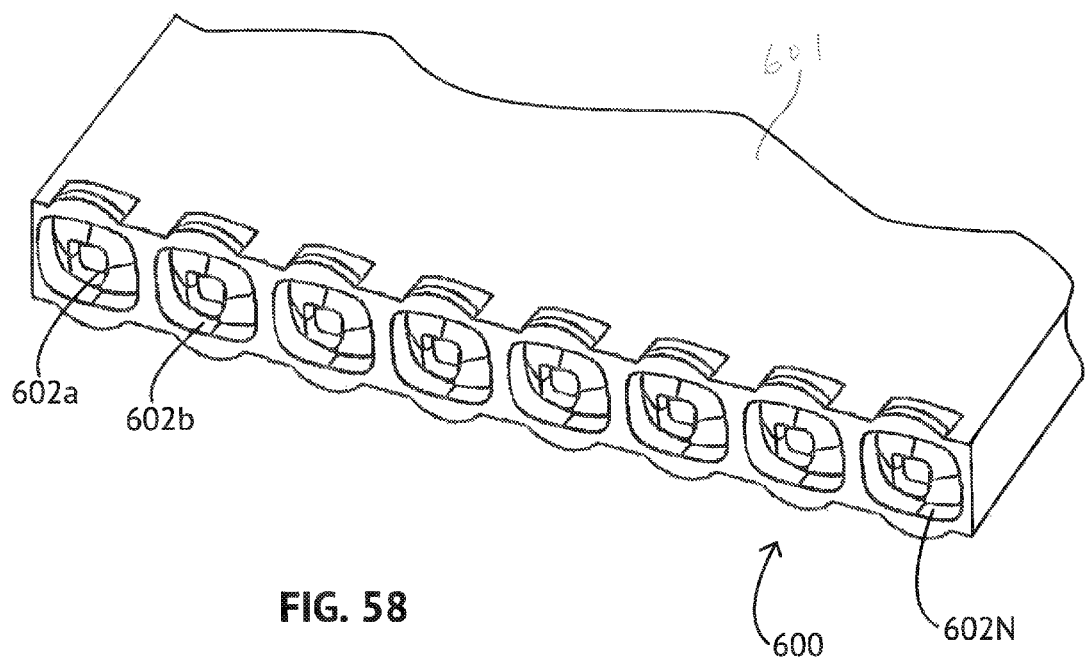
FIG. 58 is a fragmentary isometric view of a coupling optic.
Figure 59:
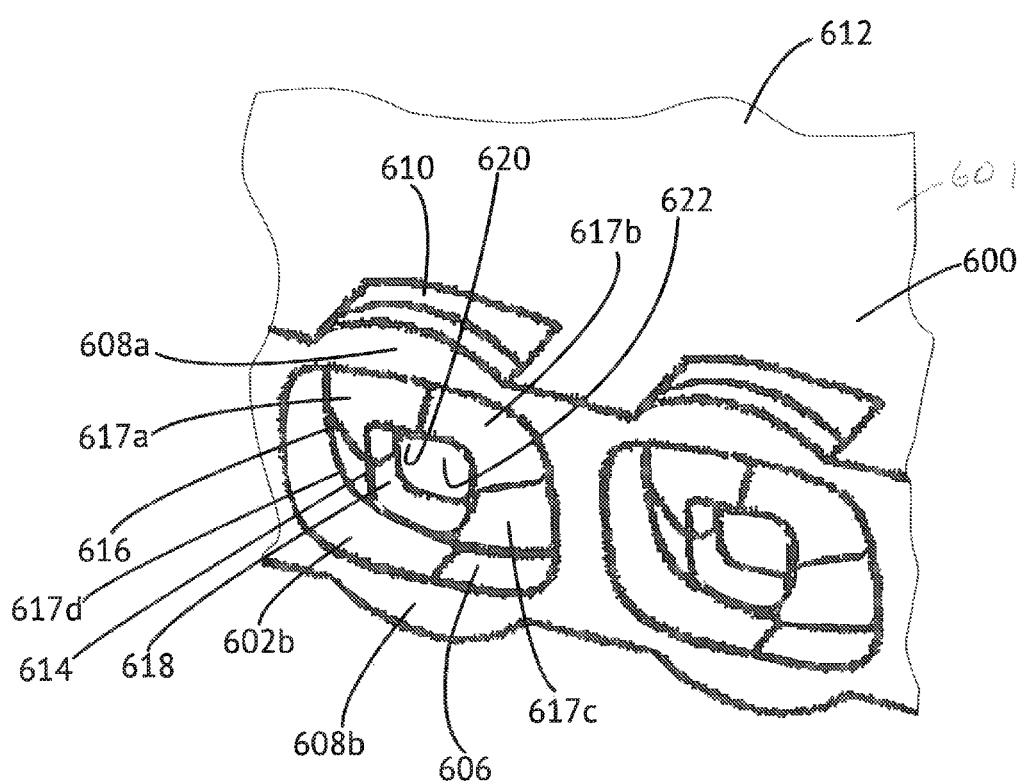
FIG. 59 is a fragmentary enlarged isometric view of the coupling optic of FIG. 58.

As seen in FIGS. 58 and 59, a further embodiment of a coupling optic 600 having a coupling optic body 601 is shown. The coupling optic is adapted for use with at least one, and preferably a plurality of LEDs of any suitable type. The coupling optic body 601 includes a plurality of input cavities 602a, 602b, . . . , 602N each associated with and receiving light from a plurality of LEDs (not shown in FIGS. 58 and 59, but which are identical or similar to the LED 56 of FIG. 1). The input cavities 602 are identical to one another and are disposed in a line adjacent one another across a width of the coupling optic 600. As seen in FIG. 59, each input cavity 602, for example, the input cavity 602h, includes an approximately racetrack-shaped wall 606 surrounded by arcuate upper and lower marginal surfaces 608a, 608b, respectively. A curved surface 610 tapers between the upper marginal surface 608a and a planar upper surface 612 of the coupling optic 600. A further curved surface identical to the curved surface 610 tapers between the lower marginal surface 608b and a planar lower surface of the coupling optic 600.

A central projection 614 is disposed in a recess 616 defined by the wall 606. The central projection 614 is, in turn, defined by curved wall sections 617a-617d. A further approximately racetrack-shaped wall 618 is disposed in a central portion of the projection 614 and terminates at a base surface 620 to form a further recess 622. The LED associated with the input cavity 602b in mounted by any suitable means relative to the input cavity 602b so that the LED extends into the further recess 622 with an air gap between the LED and the base surface 620. The LED is arranged such that light emitted by the LED is directed into the coupling optic 600. If desired, a reflector (not shown) may be disposed behind and/or around the LED to increase coupling efficiency. Further, any of the surfaces may be coated or otherwise formed with a reflective surface, as desired.

In embodiments such as that shown in FIGS. 58 and 59 where more than one LED is connected to a waveguide body, the coupling optic 600 may reduce the dead zones between the light cones of the LEDs. The coupling optic 600 may also control how the light cones overlap, which is particularly important when using different colored LEDs. Light mixing is advantageously accomplished so that the appearance of point sources is minimized.

As shown in FIGS. 1 and 12, the coupling optic guide 52 introduces light emitted from the light source 56 to the waveguide 54. The light source 56 is disposed adjacent to a coupling optic 82 that has a cone shape to direct the light through the coupling optic guide 52. The coupling optic 82 is positioned within the coupling optic guide 52 against a curved indentation 84 formed on a front face 86 opposite the output face 62 of the coupling optic guide 52. The light source 56 is positioned outside of the coupling optic guide 52 within the curved indentation 84. An air gap 85 between the light source 56 and the indentation 84 allows for mixing of the light before the light enters the coupling optic 82. Two angled side surfaces 88, the front face 86, and the output face 62 may be made of a plastic material and are coated with a reflective material. The coupling optic guide 52 is hollow and filled with air.

Other embodiments of the disclosure including all of the possible different and various combinations of the individual features of each of the foregoing embodiments and examples are specifically included herein.

INDUSTRIAL APPLICABILITY

The waveguide components described herein may be used singly or in combination. Specifically, a flat, curved, or otherwise-shaped waveguide body with or without discrete extraction features could be combined with any of the coupling optics and light sources described herein. In any case, one may obtain a desired light output distribution.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

We claim:

1. An optical waveguide body, comprising:
a first surface that extends between an input surface and an end surface;
a second surface opposite the first surface wherein a body thickness is disposed between the first and second surfaces;
wherein the body thickness at the input surface is greater than the body thickness at the end surface and the body thickness between the input surface and end surface decreases over a length of the body;
and at least one stepped feature defined by first and second oblique angles on one of the first and second surface;
wherein the first surface is curved along an entire first extent between the input surface and the end surface, and wherein the first surface is curved along an entire second extent between side surfaces wherein the first extent is orthogonal to the second extent.

2. The optical waveguide body of claim 1, wherein light is emitted through the first surface.

3. The optical waveguide body of claim 2, wherein light is internally reflected along the first and second surfaces.

4. The optical waveguide body of claim 1, wherein the first thickness is approximately 6 mm, the second thickness is approximately 2 mm, and the first surface comprises a radius of curvature of approximately 200 mm.

5. The optical waveguide body of claim 1, wherein the waveguide comprises a length between the input surface and the end surface and a width transverse to the length, wherein a distance between the first surface and the second surface decreases at least a portion along the width, and wherein the second surface is curved.

6. The optical waveguide body of claim 1, further comprising at least one extraction feature.

7. The optical waveguide body of claim 6, wherein the at least one extraction feature is located within the body.

8. The optical waveguide body of claim 6, wherein the at least one extraction feature is located on an outer surface of the body.

9. The optical waveguide body of claim 6, wherein the at least one extraction feature is an angled slot comprising parallel sides.

10. The optical waveguide body of claim 6, further comprising a reflective surface.

11. The optical waveguide body of claim 10, wherein the reflective surface is disposed adjacent to the at least one extraction feature.

12. The optical waveguide body of claim 6, wherein the extraction feature comprises a stepped feature.

13. The optical waveguide body of claim 12, wherein the stepped feature is formed on the first surface.

14. The optical waveguide body of claim 1, further comprising an array of extraction features on the first surface.

15. The optical waveguide body of claim 14, wherein the extraction features comprise sizes that vary across the first surface.

16. The optical waveguide body of claim 14, further comprising at least one reflective surface adjacent to at least one extraction feature.

17. The optical waveguide body of claim 1, in combination with a coupling optic.

18. The optical waveguide body of claim 1, further in combination with a light source.

19. The optical waveguide body of claim 1, further including unequally spaced extraction features disposed on the first surface.

20. The optical waveguide body of claim 1, further including unequally sized extraction features disposed on the first surface.

21. The optical waveguide body of claim 1, further including unequally shaped extraction features disposed on the first surface.

22. The optical waveguide body of claim 1, further including equally spaced extraction features disposed on the first surface.

23. The optical waveguide body of claim 1, further including equally sized extraction features disposed on the first surface.

24. The optical waveguide body of claim 1, further including equally shaped extraction features disposed on the first surface.

25. The optical waveguide body of claim 1, wherein the body is made of a material selected from the group comprising an acrylic material, a silicone, a polycarbonate, and a glass material.

26. An optical waveguide body, comprising:
a first surface that extends between an input surface and an end surface;
a second surface opposite the first surface;
wherein the input surface comprises a first thickness disposed between the first and second surfaces;
wherein the end surface comprises a second thickness disposed between the first and second surfaces less than the first thickness;
wherein at least one of the first and second surfaces comprises first and second pluralities of spaced surfaces wherein each surface of the first plurality of spaced surfaces is disposed between and comprises ends coincident with ends of successive surfaces of the second plurality of spaced surfaces and the first and second pluralities of spaced surfaces define an overall body thickness that does not increase at any point from the input surface to the end surface;
wherein the waveguide body develops a light distribution for general lighting;
wherein at least one of the surfaces of the first and second pluralities of spaced surfaces is disposed at an oblique angle with respect to an adjacent other surface of the first and second pluralities of spaced surfaces; and
wherein the first and the second pluralities of spaced surfaces are unequally spaced.

27. The optical waveguide body of claim 26, wherein at least one of the surfaces of the first and second pluralities is disposed at an obtuse angle with respect to an adjacent other surface of the first and second pluralities.

28. The optical waveguide body of claim 26, wherein at least one of the surfaces of the first and second pluralities is disposed at an acute angle with respect to an adjacent other surface of the first and second pluralities.

29. The optical waveguide body of claim 26, wherein an optical feature is disposed on at least one of the surfaces of the first and second pluralities.

30. The optical waveguide body of claim 29, wherein the optical feature is an extraction feature.

31. The optical waveguide body of claim 26, wherein the overall body thickness decreases between the input surface and the end surface.

32. The optical waveguide body of claim 31, wherein the overall body thickness decreases with at least one of the first and second pluralities of surfaces.

33. An optical waveguide body, comprising:
a first surface extending in a length dimension between an input surface and an end surface and the first surface extending in a width dimension orthogonal to the length dimension;
a second surface opposite the first surface;
wherein the input surface comprises a first thickness disposed between the first and second surfaces;
wherein the end surface comprises a second thickness disposed between the first and second surfaces less than the first thickness; and
wherein at least one stepped feature is located on one of the first and second surfaces and a plurality of discrete optical features is disposed on the at least one stepped feature and the discrete optical features are disposed in a sequence extending along the width dimension.

34. The optical waveguide body of claim 33, wherein the at least one stepped feature is defined by first and second obtuse angles on one of the first and second surfaces.

35. The optical waveguide body of claim 33, wherein the at least one stepped feature is defined by at least one acute angle on one of the first and second surfaces.

36. The optical waveguide body of claim 33, wherein the at least one stepped feature is defined by at least one obtuse angle on one of the first and second surfaces.

37. The optical waveguide body of claim 33, wherein each of the plurality of optical features is an extraction feature.

38. The optical waveguide body of claim 37, wherein each of the plurality of optical features is a curved protrusion.

39. The optical waveguide body of claim 38, wherein the plurality of optical features is continuously formed.

* * * * *